Dec. 10, 1963 L. C. POOLE 3,114,099
ELECTRICAL WELDING CONTROL SYSTEM
Filed April 9, 1952 7 Sheets-Sheet 1

INVENTOR.
Lloyd C. Poole
BY
Hamuel, Dickey & Pierce
ATTORNEYS.

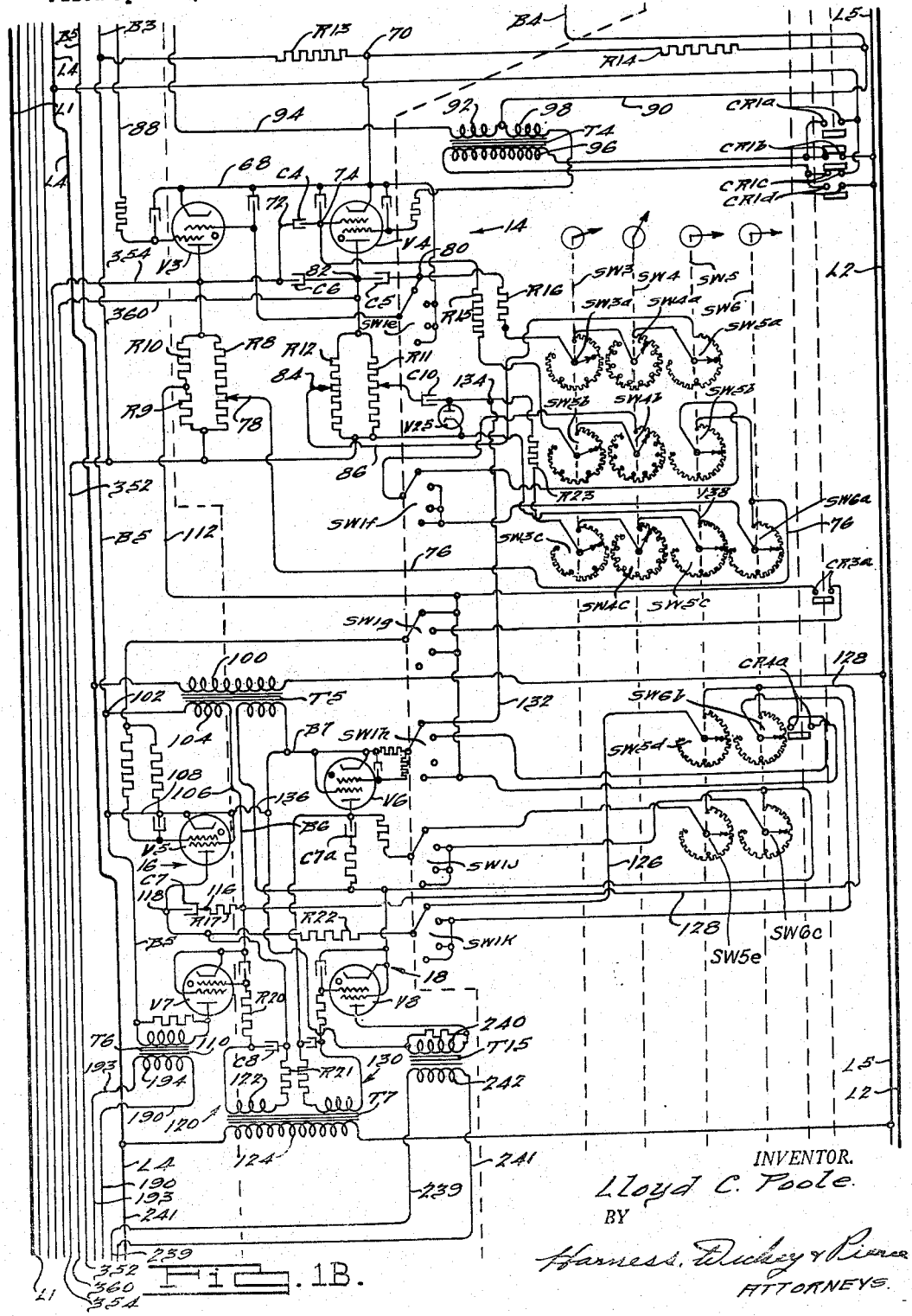

Dec. 10, 1963   L. C. POOLE   3,114,099
ELECTRICAL WELDING CONTROL SYSTEM
Filed April 9, 1952   7 Sheets-Sheet 4

INVENTOR.
Lloyd C. Poole.
BY
Harness, Dickey & Pierce
ATTORNEYS.

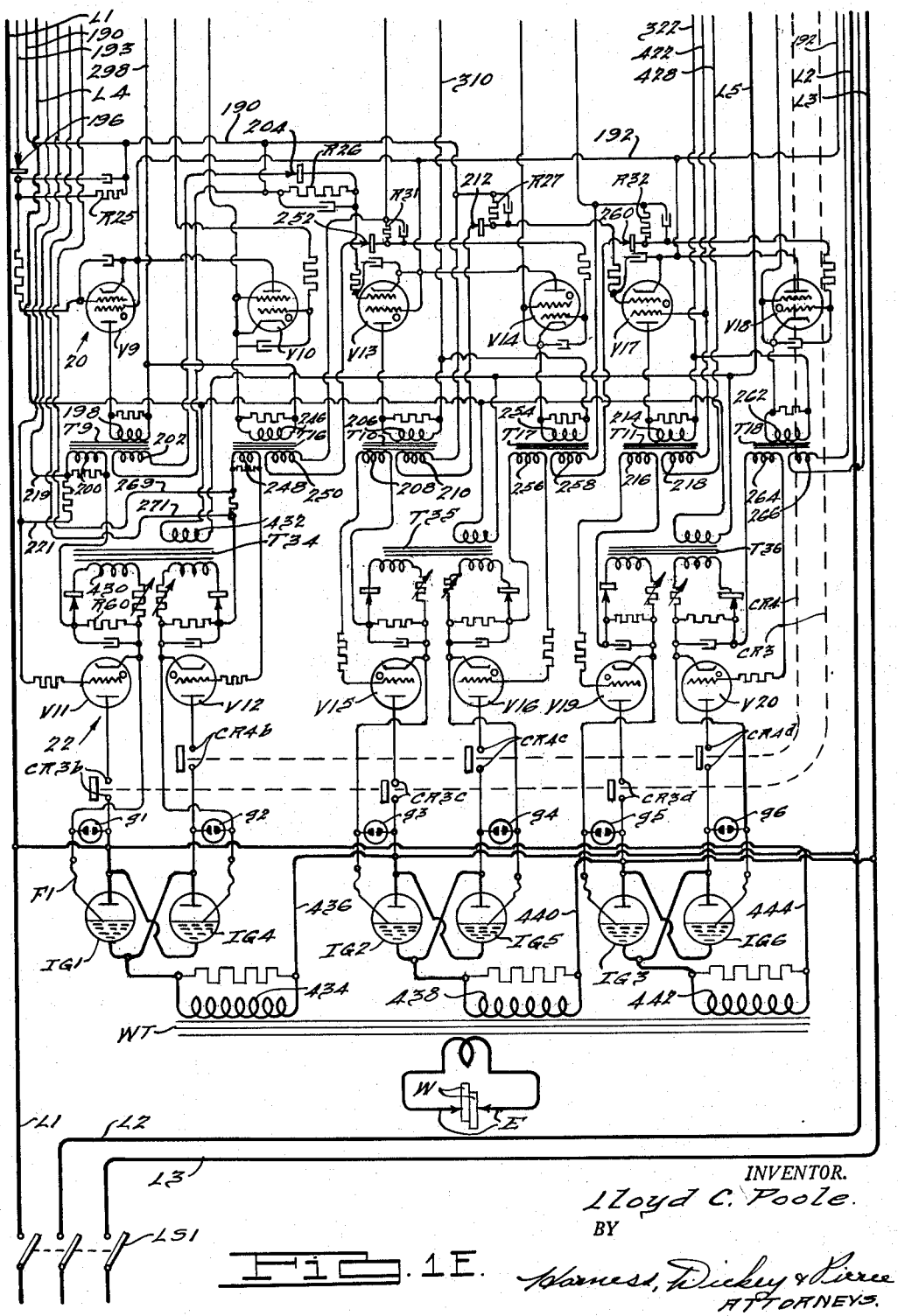

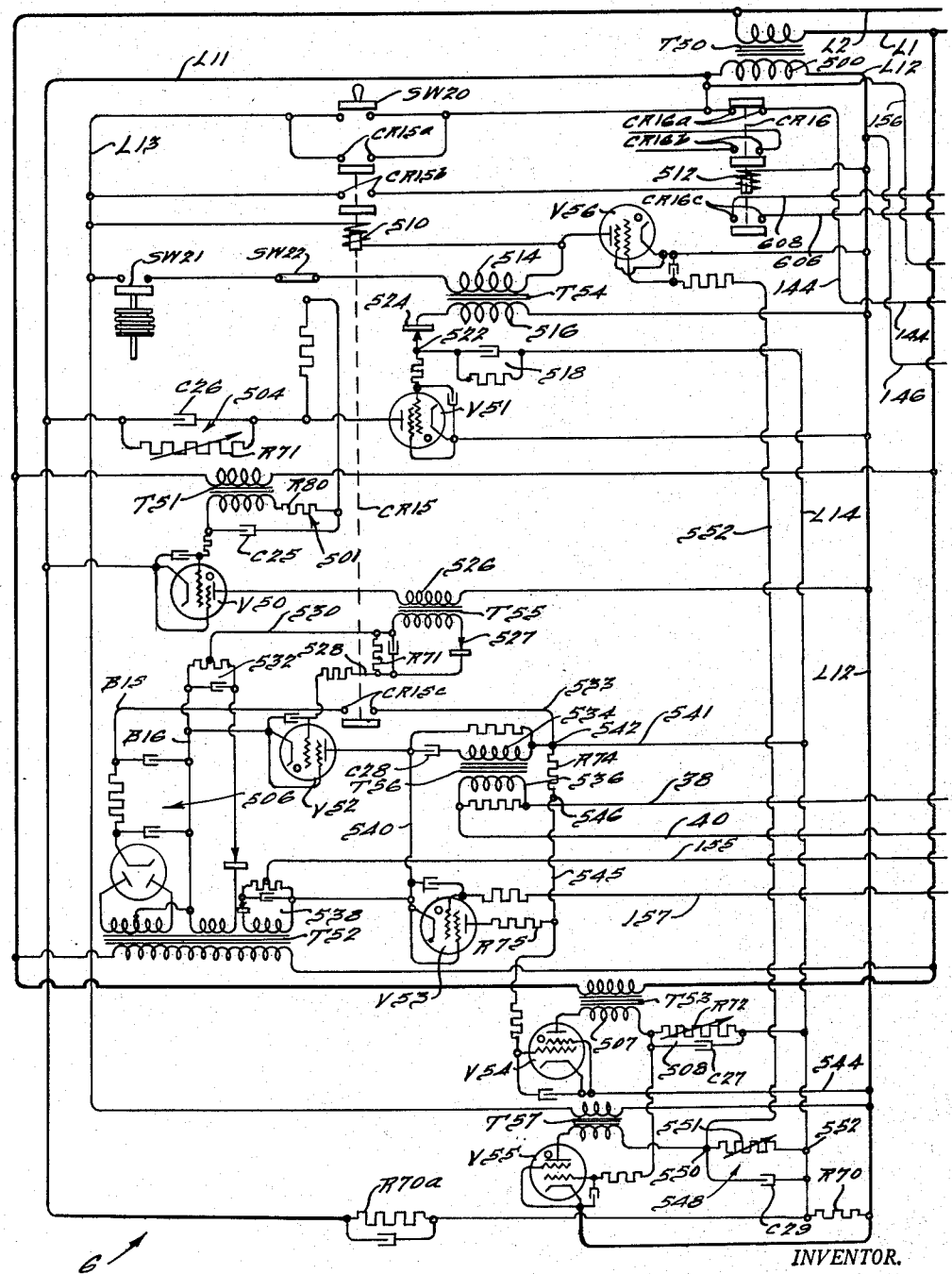

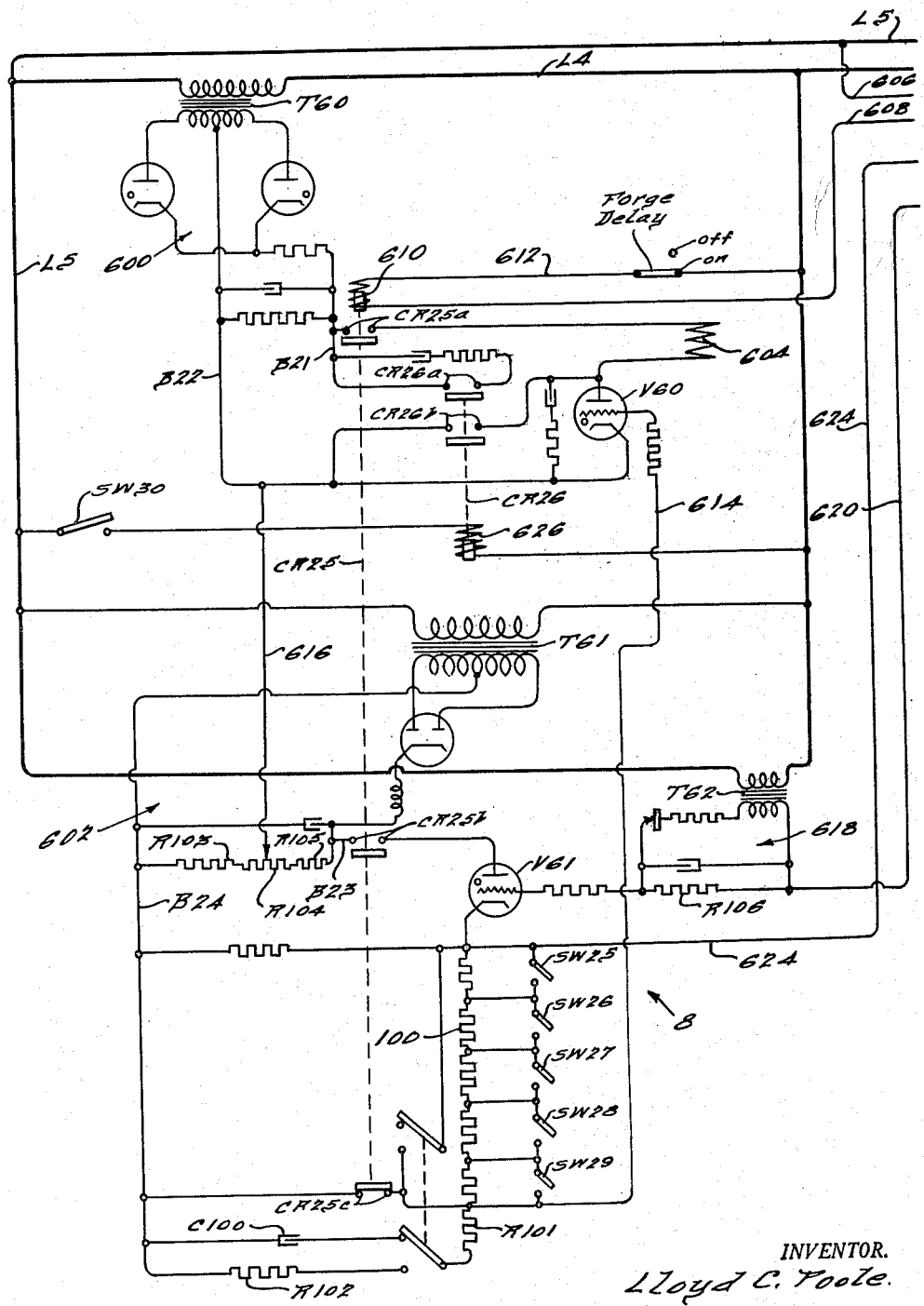

United States Patent Office 3,114,099
Patented Dec. 10, 1963

3,114,099
ELECTRICAL WELDING CONTROL SYSTEM
Lloyd C. Poole, Ferndale, Mich., assignor to Weltronic Company, Detroit, Mich., a corporation of Michigan
Filed Apr. 9, 1952, Ser. No. 281,323
46 Claims. (Cl. 323—25)

This invention relates generally to electrical control systems and is particularly adapted, among other uses, for controlling the flow of electrical energy from a source of polyphase voltage of one frequency to a single phase pulsating load of a different frequency. It constitutes an improvement over my copending application, Serial No. 214,999 filed March 10, 1951, for Electrical Control System, and now abandoned, in which certain of the more generic forms of the invention are disclosed and claimed.

An object of the invention is to provide an improved apparatus of the character described.

Another object of this invention is to provide such an apparatus which is extremely flexible and adapted for a great variety of uses.

Another object of this invention is to provide such an apparatus which may be used to supply a load with full cycle low frequency pulsating current, half cycle pulses of energy in which succeeding pulses are of alternate polarity, or half cycle welding pulses in which succeeding pulses are the same polarity.

Another object of this invention is to provide an improved structure for controlling commutation between negative and positive half cycles.

Another object of this invention is to provide such an apparatus in which the number of, and period of, cycles may be readily controlled.

Another object of this invention is to provide means for changing the power transmitted to the load.

A further object of this invention is to provide such a power charging means in which the power flowing during a half cycle may be varied within the half cycle.

Another object of this invention is to provide such an apparatus which may readily be adjusted to provide various amounts of power and in which the adjustable means may be easily readjusted.

Other objects of this invention will be apparent from the specification, the appended claims and the drawings, in which drawings:

FIGURES 1A, 1B, 1C, 1D and 1E, when arranged in end-to-end relation in the order named, provide a diagrammatic illustration of an apparatus embodying the invention for converting polyphase alternating potential to single phase load potentials;

FIGURE 2 is a schematic view of a sequencing control for use with the apparatus of FIGURES 1A through 1E and when placed at the left side of FIGURE 1A will indicate the interconnections between the sequencing circuit and the converting circuit;

FIGURE 3 is a schematic view of a forge delay control for use with the apparatus of FIGURES 1A through 1E and when placed at the left side of FIGURE 1C will indicate the interconnections between the forge delay control and the converting circuit.

Figure 1A:
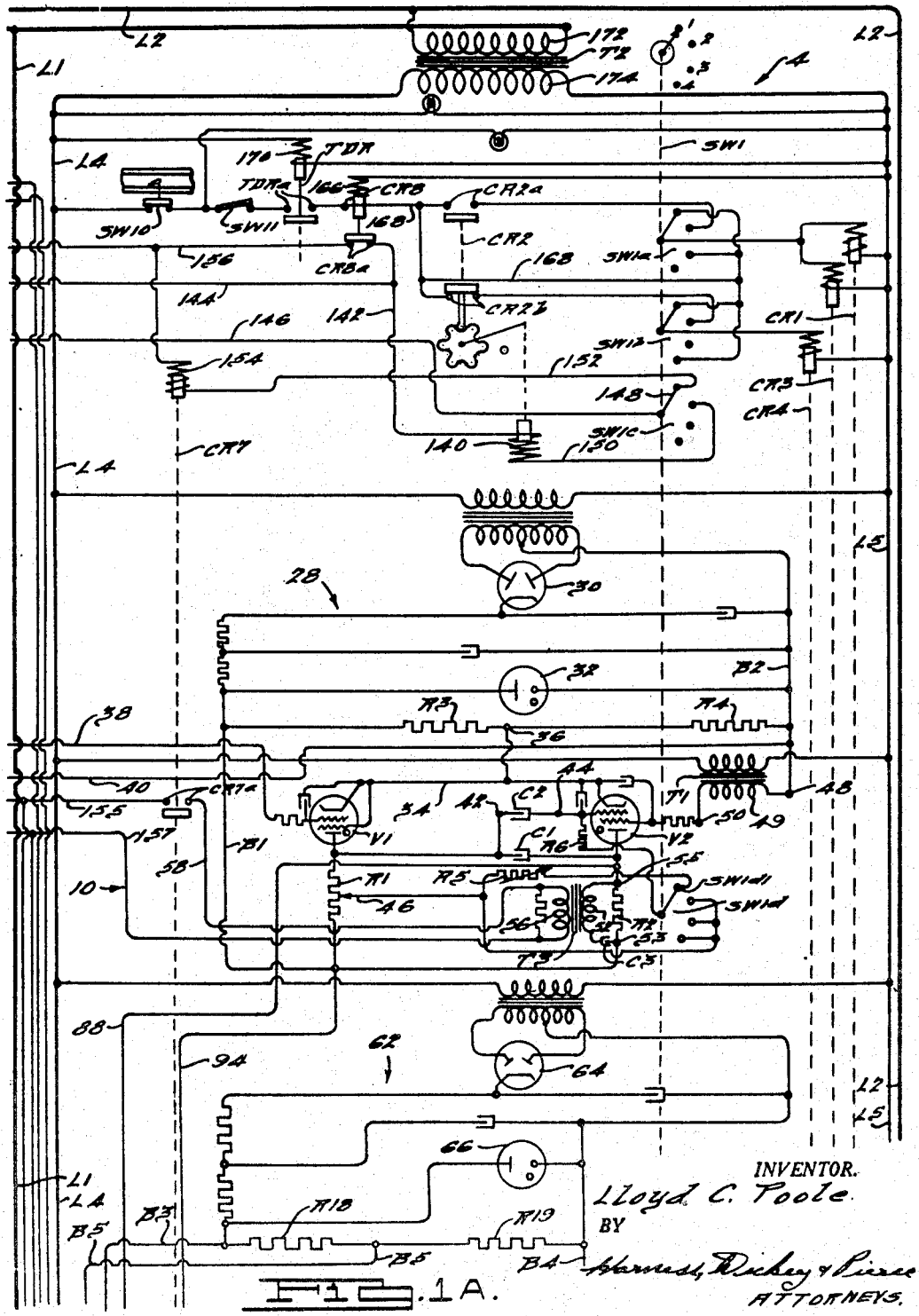
Figure 1C:
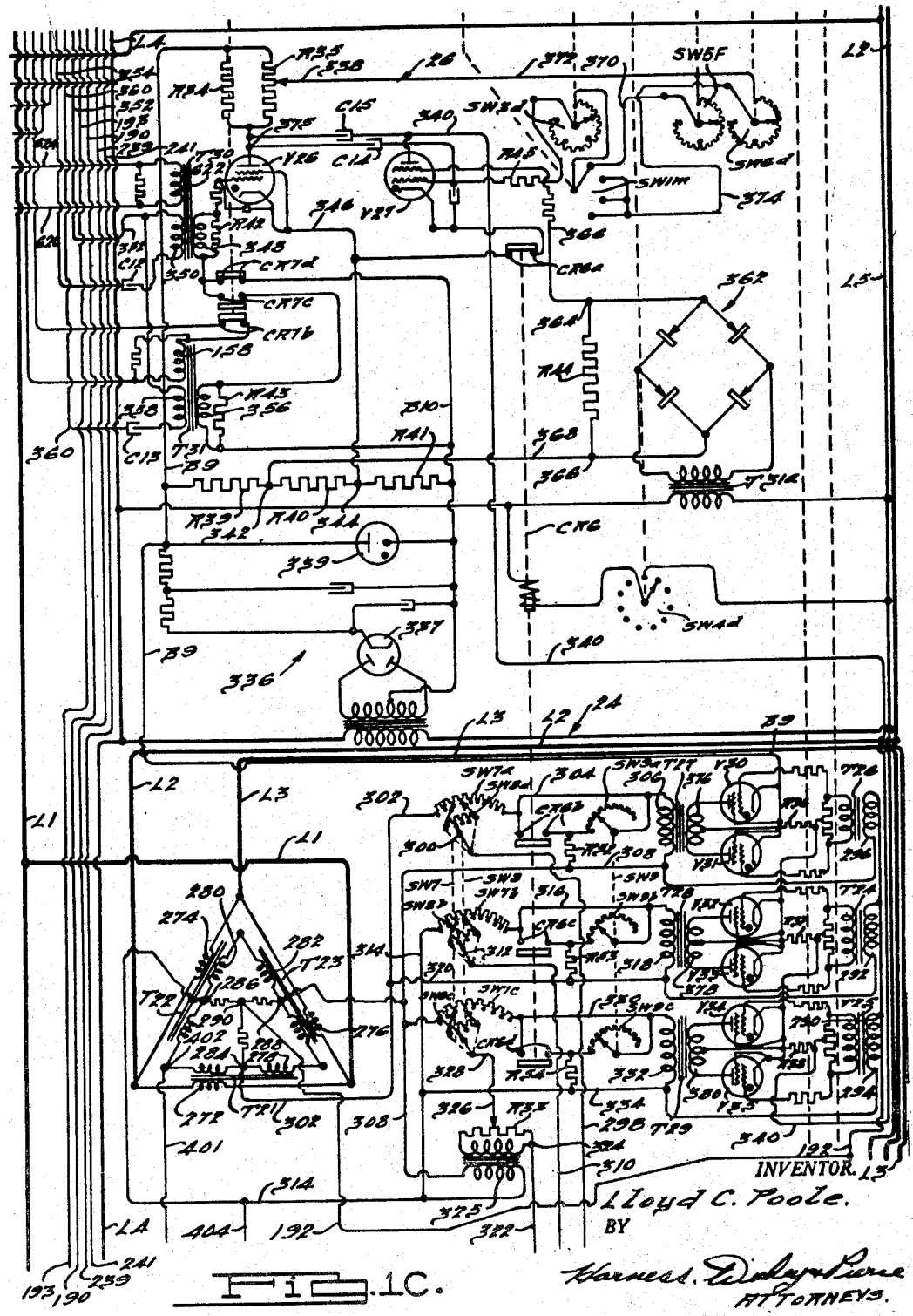
Figure 1D:
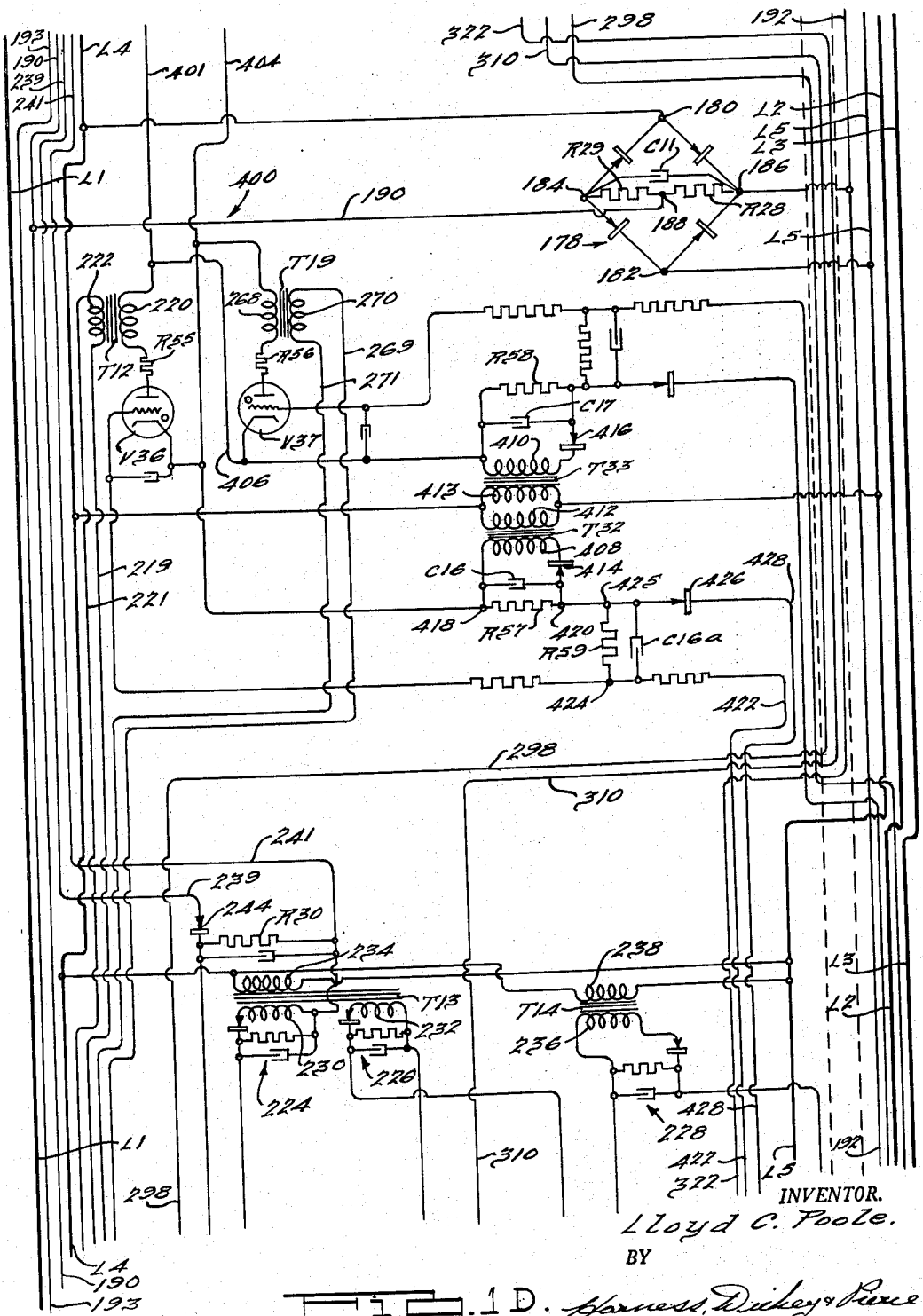

Generically, the invention provides for converting polyphase electrical energy from a three-phase supply circuit, as represented by the lines L1, L2 and L3, to a single-phase load circuit and is particularly arranged to supply single-phase energy to the welding electrodes E, either as a simulated low-frequency full-cycle alternating current or a series of simulated half cycles of current, depending upon the setting of the switch SW1. A power converting network 4, schematically shown in FIGURES 1A, 1B, 1C, 1D and 1E, is controlled by a sequencing network 6, shown in FIGURE 2, and, if desired, may be associated with a forge delay network 8, shown in FIGURE 3.

The sequencing network 6 provides the usual steps of "squeeze," "hold" and "off" and transmits an energizing pulse at the end of squeeze time to initiate operation of the converter network.

The converter network 4 upon being actuated supplies energy to the welding electrodes E during a "weld time" interval. At the end of the "weld time" interval, the converter network 4 supplies an energizing pulse back to the sequencing network 6 which then performs its steps of "hold" and "off." The converter network 4 also supplies an energizing pulse to the forge delay network 8 which thereupon times out a "forge delay" interval at the end of which the network 8 causes the electrodes E to engage the work W at an increased or forge pressure.

The ram controlling the electrodes may be of any usual type, as, for example, the ram 50 shown in Clark Patent No. 2,331,537 of October 12, 1943, in which welding pressure at the electrodes is accomplished with fluid under pressure admitted both below and above the electrode positioning piston 68 of said patent and forge pressure accomplished by quickly exhausting the pressure fluid from the underside of the piston 68.

The converter network 4 comprises a weld timing network 10, a frequency determining network 14, positive and negative half cycle interpulse timing network 16 and 18, an indexing network 20, a firing network 22, a power controlling phase shifting network 24, a tailing current controlling network 26, and an inverter network 400.

The converter network 4 with the switch SW1, in its first or shown position, provides a full low frequency alternating potential output to the electrodes E, for a weld time interval as determined by the weld time network 10. With the switch SW1 in any of its second, third, or fourth positions, the converter network 4 provides a single half cycle pulse of welding current (as described below) each time it is actuated by the sequencing network 6.

The weld time network 10, which is essentially a single shot multivibrator, comprises a normally conducting electric valve V2 and a normally nonconducting valve V1. The pulse transmitted by the sequencing network 6, at the end of squeeze time, renders the valve V2 nonconducting and the valve V1 conducting to supply a bias potential to initiate the operation of the frequency determining network 14.

The network 14 is essentially a free running multivibrator comprising the valves V3 and V4 but which is normally held with valve V3 blocked and valve V4 conducting and set into vibration as a consequence of the conduction of valve V1 for a period determined by the length of time valve V1 conducts. When valve V3 conducts, it blocks the normally conductive valve V5 of the interpulse timing network 16 which in turn, after an interpulse time delay, renders the normally blocked valve V7 conducting to render conducting the normally blocked valve V9 of the indexing network 20. When valve V3 conducts it also renders conducting the normally blocked valve V26 of the tailing current network 26 as well as rendering conducting the normally blocked valve V61 of the forge delay network 8.

Rendering of valve V9 conducting causes the ignitrons IG1—IG3 to become conductive in repeating sequence and at a desired time in the voltage waves of the input lines L1, L2, and L3, as determined by the phase shift network 24, and for a desired number of cycles of the potential of the input as determined by the conducting period of the valve V3. Sometimes prior to the termination of conduction of the valve V3, the tailing current network 26, which is essentially a single shot multivibrator, will time out and valve V27 thereof, which was extinguished by the conduction of valve V26, will reconduct and by means of relay CR6 actuate the phase shift network 24, so that the ignitrons IG1—IG3 will thereafter be rendered conductive at a later point in the voltage waves supplied thereto to reduce the energy supplied to the electrodes E.

At the end of a predetermined time period subsequent to the conduction of valve V3, valve V4 reconducts. When valve V4 reconducts, the valves V6 and V8 of the negative interpulse timer 18 are rendered nonconductive and conductive respectively in predetermined time sequence to render ignitrons IG4—IG6 sequentially conductive. Conduction of valve V4 also blocks valve V3 to render valve V5 conducting and valves V7 and V9 blocked. Upon being blocked, valve V9 can no longer render ignitrons IG1—IG3 sequentially conductive. Due, however, to the reactive character of the load circuit current will continue to flow through IG3 even though the potential supplied thereto from the lines L3—L1 reverses. The length of time that this reactive current will flow is dependent upon the magnitude of the reactance of the load circuit.

In my copending application, Serial No. 214,999, the interpulse timer is adjusted so that the timing afforded thereby is sufficient to permit this reactive current to completely or substantially completely decay prior to the rendering of the subsequent group of ignitrons conductive. The apparatus of this application provides for a shortened interpulse time and comprises structure for extinguishing conduction through the ignitron IG3 or IG6 and transferring the reactive current flow to the ignitron IG4 or IG1 respectively so that when opposite ignitron IG1 or IG4 is respectively rendered conductive for the purpose of initiating the next half cycle of energy flow to the welding transformer WT, the ignitron which is newly rendered conductive merely completes a circuit in parallel with the ignitron carrying the reactive current and no shorting of the supply lines results. This construction enables the applied line voltage from the lines L1 and L2 to be used to hasten the reversal of the current flow in the transformer WT.

The inverting operation is accomplished by the inverter network 400 which is provided with valves V36 and V37 supplied with anode potential from the potential which appears between lines L2 and L3. The valves V36 and V37 are oppositely connected across this potential so that the valve V36 will commence conducting solely during a late period in the half cycle following the conduction of ignitron IG3 in which the anode of ignitron IG1 is positive with respect to its cathode and conversely ignitron IG4 will conduct during a late period in the half cycle following the conduction of ignitron IG6 in which the anode of ignitron IG4 is positive with respect to its cathode. Conduction of valve V36 renders ignitron IG1 conductive while conduction of valve V37 renders IG4 conductive. Since at this time the anode of IG1 or IG4 will be at a higher potential than that of IG3 or IG6, respectively, the respective latter ignitron will be extinguished and the reactive current flow is transferred to the respective former ignitron.

When the switch SW1 is advanced to its second position, the weld timing network 10 is adjusted to time out prior to the rendering of valve V4 conductive so that only a single half cycle of energy will flow to the welding transformer WT. The switch SW1 also brings into operation the ratchet relay CR2 and adjusts the interrelation of the networks 14, 16, and 18 so that upon each successive operation of the sequencing network 6, the valve V3 of the frequency determining network 14 will act to energize a different one of the networks 16 and 18. With the switch SW1 advanced to its third position, the indexing relay CR2 is rendered ineffective and the network 16 is connected to be actuated each time the valve V3 is rendered conducting so that successive energy pulses will be supplied to the transformer WT in the same polarity and which pulses are arbitrarily defined as positive pulses. When switch SW1 is advanced to its fourth position, the network 18 is connected to be actuated each time the valve V3 is rendered conducting so that successive energy pulses will be supplied to the transformer WT in the same direction, but which direction is opposite to the direction when the network 16 is energized, and which latter pulses are arbitrarily defined as negative pulses.

The switches SW3, SW4, SW5, and SW6 are used to adjust the time intervals of operation of the valves of the various networks 14, 16, 18, and 26 to permit independent timing of the interpulse time, the period in which energy flows from the supply line to the welding transformer WT, and the overall length of each half cycle. The function of switch SW6 in part duplicates that of switch SW5 but is labeled differently to avoid confusion to the operator. Switch SD5 is labeled "interpulse time" since it is used when full cycle potential is supplied to the electrodes E. Switch SW6 is labeled "weld delay time" and is used when half cycles of potential are supplied since in function it provides a delay between the energization of the network 16 or 18 and the energization of the electrodes E.

Referring more specifically to the details of construction of the various networks included in the converter network 4, the weld timing circuit 10 comprises a pair of thyratron valves V1 and V2 having their anode circuits supplied with fixed value direct current from the positive and negative busses B1, B2 respectively from a rectifying network 28 having the usual full wave rectifying valve 30 and voltage discharge valve 32. The bus B1 is connected to anode of valve V1 through a potentiometer resistor R1 and to the anode of the valve V2 through a resistor R2. The cathodes of the valves V1 and V2 are connected together by a conductor 34 to the common terminal 36 between a pair of series connected resistors R3 and R4 connected between the busses B1 and B2. A commutating capacitor C1 is connected between the anodes of the valves V1 and V2 to provide for momentarily lowering the anode potential of the valve V2 upon initial conduction of the valve V1 so that the valve V2 is extinguished as a consequence of the conduction of the valve V1 so that it is placed under control of its controlling elements.

The valve VI is normally held nonconductive by a potential derived from the resistor R4 which may be overcome by potential derived from the sequencing network 6 through the conductors 38 and 40 to selectively render valve V1 conducting. The conductor 38 is connected through the usual current limiting resistor directly to the controlling grid of the valve V1 and the conductor 40 is connected to the cathode of the valve V1 through resistor R4 and conductor 34. Valve V2 is normally conducting and is rendered in its conducting condition by a positive conducting peaked potential periodically applied between its shield grid and cathode by a peaking transformer T1, which is of sufficient magnitude to overcome the blocking bias potential applied thereto by resistor R4. Since the valve V2 is of the thyratron type, upon once being rendered conducting it will continue to conduct irrespective of the potentials applied to its grids until either its anode circuit is broken or its anode potential is sufficiently lowered.

One terminal 42 of a grid potential controlling capacitor C2 is directly connected to the anode of the valve V1 and the other terminal 44 thereof is connected to the controlling grid of the valve V2. During periods in which the valve V1 is nonconducting, the terminal 42 of the capacitor C2 will effectively be disconnected from the cathode of valve V2 and will be ineffective to exert a controlling bias between the controlling grid and cathode of valve V2. During this time, however, a positive to negative charge will be established across the capacitor C2 between the terminals 42 and 44. When the valve V1 is rendered conducting, the commutating capacitor C1 momentarily reduces the anode potential of the valve V2 to a potential below that of its cathode and the valve V2 will become nonconducting. The rendering of valve V1 conducting also effectively connects the terminal 42 of the capacitor C2 to the cathode of the valve V2 thereby causing a blocking bias potential to be placed between the control grid and cathode of valve V2 to prevent reconduction thereof as its anode potential again goes positive with respect to its cathode. Upon rendering of the valve V2 nonconductive the charging circuit for the capacitor C2 is interrupted and it commences to discharge through the resistors R5, R6 and a portion of the potentiometer resistor R1 in a circuit which extends from the terminal 42 through a portion of the resistor R1, the adjustable tap 46 thereof, the resistor R5, the switch contacts SW1d1, and the resistor R6 to the terminal 44. The time period of discharge of the capacitor C2 is, during full cycle welding operation in which switch SW1 is in its No. 1 position, substantially equivalent to the desired welding time interval. At the end of this interval the capacitor C2 will have discharged sufficiently to remove the blocking bias between the control grid and cathode of the valve V2 which will then become conducting to render valve V1 nonconductive. Since, as will be explained below, the overriding bias between lines 38 and 40 is momentary, the valve V1 will remain nonconductive.

Valve V2 is rendered conductive in controlled relation to the voltage appearing between the lines L1 and L2 of the power source. This synchronizing effect is controlled by the peaking transformer T1 which has one terminal 48 of its secondary winding 49 connected through the resistor R4 and conductor 34 to the cathode of the valve V2 and its other terminal 50 connected through the usual current limiting resistor to the shield grid of the thyratron valve V2. The primary winding of the transformer T1 is connected between the lines L4 and L5 which are supplied by the transformer T2, the primary winding of which is connected between lines L1 and L2. The phasing of the transformer with respect to the lines L1 and L2 is such that a conducting bias peaking potential is applied when the line L2 is positive with respect to line L1. As will be explained in greater detail hereinafter, the conducting bias pulse applied by the sequencing network 6 is also phased with respect to the phasing of the voltage between the lines L1 and L2 so that the valve V1 will be rendered conductive when line L1 is positive with respect to line L2, at which time the transformer T1 is not applying a positive or unblocking potential to the shield grid of valve V2. This phasing of the transformer T1 is additional assurance against reconduction of valve V2 after it has been extinguished by the commutating capacitor C1 in cases of a slight delay in the establishment of the blocking potential by the capacitor C2.

At the end of the weld time period, the valve V2 reconducts and energizes a transformer T3 to transmit a control pulse back to the network 6. One terminal of the primary winding 52 of this transformer T3 is connected to one terminal 53 of resistor R2 and its other terminal is connected to the other terminal 55 of resistor R2 which is adjacent the anode of valve V2 through an impulse capacitor C3. The capacitor C3 prevents direct current from flowing in its winding 52. Upon conduction of the valve V2 and the establishing of the potential across the resistor R2, a pulse of current flows through winding 52 and the secondary winding 56 of the transformer T3 applies such pulse between the conductors 58 and 157. These conductors lead to the sequencing network 6 for initiating the running of the hold time period. During intervals when it is desired to supply the welding electrodes with single half cycle pulses of energy, the switch SW1 is moved to its No. 2, 3 or 4 position in which one of the sets of contacts SW1d2 or SW1d3 or SW1d4 closes to shunt out the weld timing control resistor R5, thereby causing the capacitor C2 to discharge at an accelerated rate so that the weld timing is accomplished by the network 14.

The frequency determining network 14 is quite similar to the weld timing circuit 10 except that the circuit 14 is arranged as an oscillating multivibrator instead of a single shot multivibrator as is the circuit 10. The frequency determining network 14 comprises thyratron valves V3 and V4 which are supplied with direct current energy from a rectifying network 62 which maintains a fixed value direct current voltage between the positive and negative busses B3 and B4 and includes the usual full wave rectifying valve 64 and the voltage regulating glow discharge valve 66. The positive bus B3 is connected to the anode of the valve V3 through a potentiometer-type resistor R8 and also through a pair of series connected resistors R9 and R10. The bus B3 is connected to the anode of the valve V4 through a pair of parallelly arranged potentiometer-type resistors R11 and R12. The cathodes of the valves V3 and V4 are connected to a common conductor 68 which is connected to a tap 70 intermediate the resistors R13 and R14 which are connected in series between the busses B3 and B4. A timing capacitor C4 is provided in the grid circuit of the valve V4 similar to the capacitor C2 of the network 10 and has one terminal 72 connected to the anode of the valve V3 and its other terminal 74 connected to the controlling grid of the valve V4. The capacitor C4 is provided with a discharge circuit which includes a fixed resistor R15 and tapped resistor sections SW3b and SW4b of the adjustable switches SW3 and SW4, portion SW1f of the switch SW1, resistor SW5b of the switch SW5, conductor 76, adjustable tap 78 of the resistor R8 and therethrough back to the other terminal 72 of the capacitor C4.

The timing capacitor C5 for the valve V3 has one terminal 80 connected through switch portion SW1e to the controlling grid of the valve V3. The other terminal 82 of the capacitor C5 is connected through the resistor R12, the adjustable tap 84 thereof, the conductor 86, tapped resistor sections SW5a, SW4a, SW3a of the switches SW5, SW4 and SW3 through a fixed resistor R16, back to the capacitor terminal 80. Commutating capacitor C6 is connected between the annodes of the valves V3 and V4 for the purposes of momentarily lowering the anode potential of one of the valves as a consequence of the initiation of conduction of other of the valves.

When switch SW1 is in its No. 2, 3 or 4 position, switch section SW1e directly connects the controlling grid to the cathode of the valve V3 so that the capacitor C5 is rendered ineffective to control the valve V3 during operation of the converter network in which it is supplying half cycle pulses to the welding electrodes E. With switch SW1 in these positions, the switch portion SW1f disconnects the resistor section SW5b from the discharge circuit of capacitor C4 and connects in lieu thereof the tapped resistor section SW6a to provide for timing a weld delay period.

The valve V3 is normally held nonconductive by means of the potential established across the resistor R2 associated with the normally conductive value V2 of the weld timing circuit 10. This blocking bias voltage is established between the shield grid and cathode of the valve V3, the shield grid of the valve V3 being connected through the usual current limiting resistor to terminal 55 by conductor 88 and the cathode of the valve V3 being connected to the other terminal 53 of the resistor R2 by means of a circuit extending through the conductor 68, resistor R14, conductor 90, secondary winding 92 of the peaking transformer T4 and conductor 94. The bias potential set up across the resistor R14 and applied between the shield grid and cathode of the valve V3 through the above-mentioned circuit is in additive relation with respect to the potential established across the resistor R2 and tends to maintain the valve V3 nonconductive in opposition to the conductive pulses supplied by the transformer T4 which has its primary winding 96 connected between the lines L4 and L5 through the reversing contacts of relay CR1. The magnitude of the bias voltage supplied by the resistor R14 in combination with resistor R2 is sufficient to prevent the conductive peaking pulse supplied by the transformer T4 from placing a conducting bias between the shield grid and cathode of the valve V3 but the pulsing peaks supplied by the transformer T4, however, are sufficient to place a conducting bias potential between the shield grid and cathode of the valve V3 when the value V2 is not conducting and no potential exists across the resistor R2. This provides for the valve V3 to become conductive in timed relation to the potential between lines L1 and L2 when a conducting bias potential appears between the control grid and cathode of this valve V3.

The shield grid of the valve V4 is utilized to time the rendering of valve V4 conductive with respect to the potential between lines L1 and L2 and is connected through a current limiting resistor to one terminal of a secondary winding 98 of the transformer T4, the other terminal of which is connected through the resistor R14 and conductor 68 to the cathode of the valve V4. The resistor R14 in this instance places a nonconducting bias voltage between the shield grid and cathode of the valve V4 which is periodically overridden by the conducting pulse supplied by the winding 98 of the transformer T4. The windings 92 and 98 are phased with respect to the potential between lines L1 and L2 so that with the reversing contacts CR1a, CR1b, CR1c and CR1d in the closed, open, open, closed positions respectively a pulse in the polarity to cause conduction of valve V3 occurs when line L1 is positive with respect to line L2 and a pulse in the polarity to cause conduction of valve V4 when line L2 is positive with respect to line L1.

The positive half cycle interpulse timing circuit 16 comprises a pair of valves V5 and V7, which are supplied with alternating anode potential by the transformer T5 which has its primary winding 100 connected between the lines L4 and L5.

One terminal 102 of the secondary winding 104 is connected to a bus B5 and the other terminal 106 is connected to a bus B6. The anode of the valve V5 is connected through a timing capacitor C7 and current limiting resistor R17 to the bus B6. The cathode of the valve V5 is directly connected to the bus B5 by a conductor 108. The valve V7 is connected in opposite polarity between the busses B5 and B6 and conducts current during the opposite half cycle to that in which the valve V5 conducts. Its anode is connected through the primary winding 110 of a transformer T6 to the bus B5. The cathode of the valve V7 is directly connected to the bus B6.

Valve V5 is controlled by means of the potential established across the resistor R9 of the network 14 and has its control grid connected through the usual current limiting resistor, switch portion SW1g and conductor 112 to the common point between the resistors R9 and R10. The cathode of valve V5 is connected through conductor 108, bus B5, resistor R18, and bus B3 to the terminal of the resistor R9 connected to bus B3. The resistor R18 and a second resistor R19 are connected in series and between the busses B3 and B4.

The voltage drop across the resistor R18 is applied as a conducting bias voltage between the control grid and cathode of the valve V5 while that which appears across the resistor R9 is of a polarity tending to maintain the valve V5 blocked. When the resistor R9 is energized as a consequence of the conduction of valve V3 it overrides the conducting potential existing across the resistor R18 to block the valve V5. Normally the valve V3 is held nonconductive as above described and as a consequence the valve V5 is normally conductive. Since the valve V5 is normally conductive the capacitor C7 will normally be charged sufficiently to apply a blocking potential between the control grid and cathode of valve V7. One terminal 116 of this capacitor C7 is connected through the resistor R17 and bus B6 to the cathode of the valve V7 and the other terminal 118 thereof is connected through the clipping network 120 and current limiting resistor R20 to the control grid of the valve V7.

The clipping network 120 comprises a capacitor C8 connected across the output terminals of the secondary winding 122 of a transformer T7 having its primary winding 124 connected between the lines L4 and L5. A resistor R21 is also arranged in series circuit in this network 120. This network provides a voltage across capacitor C8 which leads the voltage supplied between the anode and cathode of the valve V7 by slightly less than 180 electrical degrees. Because of this leading relationship of the voltage across the capacitor C8 with respect to that across the anode and cathode of the valve V7, the capacitor C8 will apply a negative blocking voltage to the valve V7 at all times except during the initial first few degrees of the voltage wave applied to the valve V7 in which the anode is positive with respect to the cathode to insure that the valve V7, if it conducts at all, will conduct for a full half cycle.

The capacitor C7 is provided with a discharge circuit which extends from the terminal 118 thereof through the fixed resistor R22, switch portion SW1k, conductor 126, tapped resistor section SW5d, conductor 128 and resistor R17 back to the capacitor terminal 116. The resistor section SW5d is disconnected upon movement of the switch SW1 to its No. 2, 3 and 4 positions and the discharge circuit extends through switch sections SW1k and tapped resistor section SW6b back to the conductor 128. During full cycle operation of the converter network with switch SW1 in its No. 1 position, the tapped resistor section SW5d acts to measure out interpulse time or the time between the rendering of valve V5 blocked and the valve V7 conductive while during periods in which the switch SW1 is in its No. 2, 3 and 4 positions and the converter network acts to supply half cycles of current to the electrodes E, the resistor section SW6b acts to measure the weld delay interval. Switch portion SW1g, with switch SW1 in its No. 1 or No. 3 position, directly connects the controlling grid of valve V5 to conductor 112, when in its No. 2 position connects this grid to conductor 112 through the normally open contacts CR3a and when in its No. 4 position isolates this grid from the conductor 112.

The negative interpulse timing circuit 18 is similar to the circuit 16 except that its polarities are reversed and comprises a normally conductive valve V6 and a normally blocked valve V8, a clipping network 130, a time controlling tapped resistor section SW5e of switch SW5 for determining interpulse time and resistor section SW6c for determining weld delay periods, a switch section SW1j for controlling the one of the tapped resistor sections SW5e or SW6e which is utilized to determine the discharge time period of the timing capacitor C7a. The switch portion SW1h with the switch SW1 in its No. 1 position connects the controlling grid of valve V6 to a conductor 132, in its No. 2 position connects this grid to conductor 112 through normally open contacts CR4a, in its No. 3 position isolates this grid from both the conductor 112 and 132 and in its No. 4 position connects this grid directly to the conductor 112. Conduction of the valve V6 is, therefore, controlled either by the potential established across a resistor R23 and the tapped resistor sections SW3c, SW4c and SW5c or by the potential across resistor R9 or remains continually conducting depending upon the setting of switch SW1.

More specifically with switch SW1 in its No. 1 position, the controlling grid of the valve V6 is connected through the usual current limiting resistor through switch portion SW1h, conductor 132 to the common terminal 134 of the resistor R23 and a timing capacitor C10. The cathode of the valve V6 is connected through the bus B7, conductor 136, conductor 108, bus B5, resistor R18 and bus B3 to the terminal 138 of the tapped resistor section SW5c. When the switch SW1 is in its No. 2 position the controlling grid of the valve V6 is connected through the normally open contacts CR4a of the control relay CR4 to the conductor 112 so that the valve V6 will, when relay CR4 is energized, respond to the bias potential appearing across the resistor R9 in response to the conduction of the valve V3.

The relays CR3 and CR4 have their energizing windings shown in the upper portion of FIGURE 1A and are controlled in response to the operation of a ratcheting relay CR2 or directly by the switch SW1 depending upon the setting of switch SW1. The energizing winding 140 of the relay CR2 has one terminal connected by conductors 142 and 144 and through normally closed contacts CR16a of control relay CR16 (found in sequencing control network shown in FIGURE 2) to line L11 constituting one side of a source of electrical potential. The other side of this source L12 is connected by conductor 146 to the switch arm 148 of the switch portion SW1c. The other side of the winding 140 is connected by conductor 150 to a second contact of the switch portion SW1c so that when the switch SW1 is in its No. 2 position and the contacts CR16a are closed, the control relay CR2 will be energized to shift the relative positions of its contacts CR2a and CR2b.

With the switch SW1 set in its No. 1 position for full cycle operation, the switch SW1c will be in its first position in which the switch arm 148 will connect the conductor 146 to a conductor 152 which is connected to one end of the energizing winding 154 of the control relay CR7. The other end of this winding 154 is connected to a conductor 156 which leads directly to line L11 of the sequencing network (FIGURE 2).

With the switch SW1 in its No. 1 position, the relay CR7 is energized to close its contacts CR7a and CR7c and to open its contacts CR7b and CR7d. Closure of contacts CR7a connects the secondary winding 56 of the transformer T3 to supply a control potential pulse to the sequencing network 6 through conductors 155 and 157 at the end of the weld time period as determined by the weld timing circuit 10. Closure of the contacts CR7c and opening of contacts CR7d render the secondary winding 356 of transformer T31 effective to supply pulses to the control circuit of valve V26. Opening of contacts CR7b renders secondary winding 158 of the transformer T31 ineffective to transmit pulses to the conductors 155 and 157. If the switch SW1 is turned to any position other than its No. 1 position, the relay CR7 is deenergized to open its contacts CR7a to effectively disconnect the secondary winding 56 of the transformer T3 from the conductors 155 and 157 to prevent T3 from supplying a pulse to the sequencing network and close its contacts CR7b to render the winding 158 of the transformer T31 effective to supply such pulses to these conductors 155 and 157. Closure of contacts CR7d and opening of contacts CR7c effectively disconnect winding 356 of the transformer T31 from the grid circuit of valve V26.

The conductor 142 is connected to the conductor 156 through the normally closed contacts CR8a of the relay CR8 so that the relay CR2 will remain energized under control of the relay CR8 and not be periodically energized by the relay CR16 during periods in which the converter network 4 is not effective to supply energy to the electrodes E even though the various control circuits thereof may be actuated. One terminal of the winding 166 of relay CR8 is directly connected to the line L5 and the other terminal of the winding 166 is connected through the normally open contacts TDRa of the time delay relay TDR, the weld no-weld switch SW11 and the contacts of the flow switch SW10 to the line L4. As diagrammatically illustrated the switch SW10 will be in closed position whenever coolant is flowing to the welding or other apparatus requiring such coolant. The switch SW11 is a weld no-weld switch and when closed will permit the converter network 4 to supply energy to the welding electrodes E. When in open position the various circuits and networks may become actuated, however, no current will be permitted to flow to the electrodes because of the deenergized condition of the contacts CR3b, CR3c, CR3d, CR4b, CR4c and CR4d of the relays CR3 and CR4. The energizing windings of these relays CR3 and CR4 are each connected in series with the switch SW1 by the conductor 168 when the switch SW1 is in its No. 1 position.

The energizing winding 170 of the relay TDR is directly connected between the lines L4 and L5 so that upon closure of the line switch LS1 to connect the lines L1, L2 and L3 to a suitable source of polyphase supply and the energization of the primary winding 172 of the transformer T2 to cause its secondary winding 174 to provide an alternating potential between the lines L4 and L5, the winding 170 will be immediately energized. After a predetermined time delay which may be one minute or so, the time delay relay TDR will act to close its contacts TDRa thereby completing an obvious energizing circuit for relay CR8 and relays CR1, CR3 and CR4 providing the switch SW11 is in closed position. Closure of the line switch LS1 and energization of lines L1, L2 and L3 also acts to energize the heating elements (not shown) of the various valves shown in the networks 4, 6 and 8 which, during the time interval prior to closure of the contacts TDRa, act to raise the temperature of the various valves to operating temperature. The circuit for the heating elements for these various valves has not been shown in the interest of simplifying the drawings since these circuits are conventional.

The indexing network 20 for controlling the firing network 22 for the ignitrons IG1 through IG6 comprises two groups of thyratron valves V9, V13 and V17; and V10, V14 and V18. The group V9, V13 and V17 control, respectively, the valves V11, V15 and V19 of the firing network 22, while the group V10, V14 and V18 control the firing valves V12, V16 and V20 of the network 22. The valves V11, V15 and V17, upon being rendered conductive, render the ignitrons IG1, IG2 and IG3 conductive and the valves V12, V16 and V20, upon being rendered conductive, render the ignitrons IG4, IG5 and IG6 conductive.

The valves V9, V13 and V17 are normally maintained nonconductive due to the blocking bias potentials applied between their grids and cathodes from the potential established across a resistor R28 energized from a full wave rectifying network 178. More specifically, the network 178 has its alternating current input terminals 180, 182 connected respectively between the lines L4 and L5. Its direct current output terminals 184, 186 are connected together by means of a pair of series connected resistors R28 and R29 having a common terminal 188. A capacitor C11 is connected in parallel with the resistors R28 and R29 to provide a substantially constant direct current potential between the terminals 184 and 186. A conductor 190 connected to terminal 188 is connected through resistor R25 and current limiting resistor to the controlling grid of the valve V9 through resistor R26 and current limiting resistor to the grid of the valve V13 and through resistor R27 and current limiting resistor to the grid of the valve V17. The other terminal 186 is connected by conductor 192 directly to the cathodes of the valves V9, V13 and V17. The secondary winding 194 of the transformer T6 is connected by conductors 190 and 193 across the resistor R25 in series with a rectifier 196 so that during periods in which the transformer T6 is energized by conduction of the valve V7, the transformer T6 will apply an overriding potential to the resistor R25 permitting a conducting bias to be established between the grid and cathode of the valve V9.

The primary winding 198 of a transformer T9 is connected in series with the anode of the valve V9 and is energized upon conduction of the valve V9 to energize its secondary winding 200 to render the valve V11 conductive as will be described below. The transformer T9 also has a second secondary winding 202 which is connected in series with a rectifier 204 across the resistance R26 to establish a potential in R26 which will override the normal blocking bias voltage of resistor R28 and establish a conducting bias voltage on the valve V13 to permit this valve to conduct. A transformer T10 has its primary winding 206 connected in series with the anode of the valve V13 so that upon conduction of the valve V13 its secondary winding 208 will override the normal blocking voltage on the valve V15 to cause conduction of this valve. The transformer T10, like that of the transformer T9, has a second secondary winding 210 which is connected across the resistor R27 in series with a rectifier 212 so that upon energization it will establish a voltage across R27 which will override the normal blocking bias voltage established by the resistor R28 and establish a conducting bias voltage on the valve V17 so that this valve will conduct. A transformer T11 has its primary winding 214 connected in series with the anode of the valve V17 so that upon conduction of the valve V17 its secondary winding 216 will override the negative blocking bias potential on the valve V19 and render this valve conductive. The transformer T11 has a second secondary winding 218 which is arranged to control the conductivity of valve V36 which, as will be described more fully below, will become conductive to energize the primary winding 220 of the transformer T12 having its secondary winding 222 connected by conductors 229 and 221 to energize a resistor connected in series with the resistor connected across the winding 200 in the control circuit of valve V11. The action of the valve V36 is such that the transformer T12 is energized to supply a conducting bias potential to the valve V11 late in the voltage wave during which the ignitron IG1 is capable of conducting. This potential is without effect during such half cycles in which the valve V9 has previously been rendered conductive by the aforesaid action of valve V7. If, however, this action occurs during the next succeeding such voltage wave after the valves V7 and V9 have been rendered nonconductive, then the ignitron IG1 will be fired to act to commutate between half cycles of output energy as supplied by the two groups of ignitrons IG1—IG3 and IG4—IG6.

The valves V10, V14 and V18 are normally maintained nonconductive by bias potentials set up across the networks 224, 226 and 228. The networks 224 and 226 are energized from secondary windings 230 and 232 of a transformer T13, the primary winding 234 whereof is directly connected between the lines L4 and L5. The network 228 is energized from a secondary winding 236 of a transformer T14 having its primary winding 238 connected between the lines L4 and L5. The primary winding 240 of transformer T15, of the interpulse timing network 18, is connected in series with the anode of the valve V8 similarly as was the primary winding 110 of the transformer T6 with the valve V7 and has its secondary winding 242 connected by conductors 239 and 241 in series with a rectifier 244 across a bias controlling resistor R30 so that upon conduction of the valve V8 and energization of the transformer T15, a conducting bias voltage will be established between the grid and cathode of the valve V10 to render this valve conductive.

The valves V10, V14 and V18 are connected together for sequential operation and for actuating respectively the valves V12, V16, V20 and V37 in the same manner as the valves V9, V13 and V17 are connected together and connected to actuate the valves V11, V15, V19 and V36 except that each of these valves are arranged to be actuated during the opposite half cycles of the voltage appearing across the lines L1, L2 and L3. The valves V10, V14 and V18 are respectively connected in anti-parallel relation with the valves V9, V13 and V17 across the output voltage of the phase shifting network 24. The valves V10, V14 and V18 are provided with the primary windings 246 of transformer T16, 254 of transformer T17 and 262 of transformer T18 respectively in series with their cathodes. The transformers T16, T17 and T18 are provided with secondary windings 248—250, 256—258, and 264—266 respectively which are connected to render the valves V12—V14, V16—V18, and V20—V37 conductive. Rectifiers 244, 252 and 260 are arranged in series with the windings 242, 250 and 258 respectively to energize the resistors R30, R31 and R32 respectively with a unidirectional voltage which is polarized to render valves V10, V14 and V18 conductive respectively.

The primary winding 268 of a transformer T19 is connected in series with the anode of valve V37 similarly to the transformer T12 and valve V36. The secondary winding 270 of the transformer T19 is connected by conductors 269 and 271 in series with a resistor arranged in series circuit with a resistor connected across the secondary winding 248 of the transformer T16 similarly as were the windings 200 and 222. The valve V37, due to the phase of its anode potential, is arranged to conduct late in the conducting half cycle of voltage across the ignitron IG4. This potential supplied by the transformer T19 is without effect to fire ignitron IG4 if the valve V10 is conducting. If, however, this action occurs during a half cycle in which valve V10 is not conducting, the ignitron IG4 will be rendered conductive by this pulse late in the half cycle of conducting voltage applied across the ignitron IG4 to render it conductive to commutate between the just finished and the next to occur half cycles of voltage supplied to the electrodes E.

It will now be seen that a first half cycle which will be called a positive half cycle of voltage to the electrodes E is initiated by conduction of the valve V7 to unblock the valve V9. The valves V9, V13 and V17 are arranged for sequential operation and, therefore, initial conduction of the valve V9 renders the ignitrons IG1, IG2 and IG3 conductive to energize the welding transformer WT as a consequence of the initial rendering of valve V9 conductive. The valves V9, V13 and V17 will continue to be sequentially rendered conductive for as many cycles of the supply voltage between lines L1 and L2 as the valve V7 remains conductive which is determined by the timing constant of the network 14.

Similarly conduction of the valve V8 renders the valve V10 conductive and the valves V14, V18 trail to render the ignitrons IG4, IG5 and IG6 conductive to energize the transformer WT in an opposite direction to supply the negative half cycle to the welding electrodes E and for as many voltage cycles of lines L1 and L2 as the valve V8 conducts.

The particular instant in the voltage cycle of the lines L1, L2 and L3 that the valves V9, V13 and V17, and V10, V14 and V18 are rendered conductive is determined by means of the power controlling phase shift network 24, as determined by the setting of switches SW7, SW8 and SW9 and the conductivity of valves V30—V35. The network 24 comprises three transformers T21, T22 and T23 having their primary windings 272, 274 and 276 connected in delta between the lines L1, L2 and L3, the winding 272 being connected between the lines L1, L2, the winding 274 being connected between the lines L2, L3 and the winding 276 being connected between lines L3, L1. The transformers T21, T22 and T23 have, respectively, center tapped secondary windings 278, 280 and 282 also connected in delta and are provided with center tap terminals 284, 286 and 288 respectively. The cathode of the valve V9 and anode of the valve V10, cathode of the valve V13 and anode of the valve V14, cathode of the valve V17 and anode of the valve V18 are all connected together to the conductor 192 and therethrough to a neutral terminal 290. This neutral terminal is formed by connecting the primary windings 292, 294 and 296 of the transformers T24, T25 and T26 respectively in Y with the common point being the terminal 290. The free ends of the windings 292, 294 and 296 are connected respectively to the terminals 284, 286 and 288.

The anode of the valve V9 is connected through the winding 198 of the transformer T9 and the cathode of the valve V10 is connected through the winding 246 of the transformer T16 each to a conductor 298 connected to the movable arm 300 of the tapped resistor section SW8a of the switch SW8. The resistor section SW8a is movable relative to the tapped resistor section SW7a of switch SW7. One terminal of section SW7a is connected by a conductor 302 to the terminal 284 and the other terminal thereof is connected by the conductor 304 through the primary winding 306 of a transformer T27 to conductor 308 which leads to the terminal 288. The anode of the valve V13 is connected through the primary winding 206 of transformer T10 and the cathode of valve V14 is connected through the primary winding 254 of transformer T17 each to a conductor 310 to the movable arm 312 of the tapped resistor section SW8b of switch SW8, which section, in turn, is movably associated with the tapped resistor section SW7b of switch SW7. One terminal of the section SW7b is connected by lead wire 314 to the terminal 286 and the other terminal of the switch section SW7b is connected by conductor 316 to one side of primary winding 318 of transformer T28. The other terminal of winding 318 is connected by lead wire 320 to the lead wire 302 connected to the terminal 284. The anode of the valve V17 is connected through the primary winding 214 of the transformer T11 and the cathode of the valve V14 is connected through the primary winding 262 of the transformer T18 each to a conductor 322 to one terminal 324 of a potentiometer resistor R33. The resistor R33 is connected to be energized from the secondary winding of a transformer the primary winding 325 whereof is connected between terminals 286 and 288. The movable tap 326 of the resistor R33 is connected to the movable tap 328 of the tapped resistor section SW8b of switch SW8 which section, in turn, is movably associated with the tapped resistor section SW7c of switch SW7. One terminal of this section SW7c is connected to the conductor 308 and therethrough to the terminal 288. The other terminal of this section is connected by conductor 330 to one terminal of the secondary winding 322 of transformer T29. The other terminal of the winding 332 is connected by conductor 334 to the conductor 314 and therethrough to the terminal 286.

With this arrangement a phase shifted voltage from the network 24 is applied to the anode circuits of the valves V9, V10, V13, V14, V17 and V18 so that during the periods when these valves are rendered conductive by the proper potential being applied between their grids and cathodes, the valves will conduct at the proper time with respect to the voltage waves between the lines L1—L2, L2—L3, and L3—L1. The ignitron firing valves V11, V12, V16, V19 and V20 will be caused to conduct to render the ignitrons IG1—IG6 at the proper time in the voltage waves to supply the proper amount of energy to the welding electrodes E.

The electronic tailing current controlling network 26 is provided to phase shift the voltage supplied by the network 24 to provide for changing the energy flowing to electrodes E. The tailing network 26 may be used whenever the valves V7 or V8 are controlled to fire for more than one cycle of the voltage wave supplied by the conductors L1, L2 and L3 wherein for any one half cycle of energy supplied to the electrodes E each of the ignitrons fire more than once. This network 26 comprises the timing valves V26, V27 which control the conductivity valves V30, V31, V32, V33, V34 and V35 which control the impedance placed in the phase shifting network 24 by the transformers T27, T28 and T29. The valves V26 and V27 are arranged to be supplied with direct current potential similarly as are the valves V1 and V2 of the timing circuit 10 and are energized from the positive and negative direct current busses B9 and B10 supplied by the rectifying network 336 having the full wave rectifying valve 337 and the voltage controlling glow valve 339. The bus B9 is connected to the anode of the valve V26 through parallelly arranged resistor R34 and potentiometer resistor R35 having the adjustable tap 338. The bus B9 is connected through series arranged resistors R36, R37 and R38 to conductor 340 which is connected to the anode of the valve V27. Resistors R39, R40 and R41 are connected in series between the busses B9 and B10 and are provided with a terminal 342 intermediate the resistors R39 and R40 and a terminal 344 intermediate the resistors R40 and R41. The cathodes of the valves V26 and V27 are each connected to a conductor 346 which is connected to the terminal 344. The connection between the cathode of the valve V27 and conductor 346 is through normally closed contacts CR6a of relay CR6. The valve V26 is normally maintained in a blocked or nonconducting condition by means of a blocking bias potential applied between its controlling grid and cathode which is derived from the resistor R41. More specifically, the controlling grid of the valve V26 is connected through the usual current limiting resistor, a resistor R42 and through either the normally closed contacts CR7d to the bus B10 or through the normally open contacts CR7c and resistor R43 to the bus B10.

A transformer T30 has its secondary winding 348 connected across the terminals of the resistor R42 whereby energization of the transformer T30 results in the application of a potential across the resistor R42 of a polarity tending to render valve V26 conductive. One terminal of the primary winding 350 of transformer T30 is connected by a conductor 352 to the bus B3 of the network 14. The other terminal of the winding 350 is connected through an impulse capacitor C12 and conductor 354 to the anode of the valve V3 so that the voltage established across the resistors R8, R9 and R10 as a consequence of the conduction of the valve V3, will cause a surge current to flow in the transformer T30 in a direction to establish a potential across the resistor R42 which overcomes the blocking bias potential maintained by the resistor R41 causing the valve V26 to conduct.

A transformer T31 has a secondary winding 356 which is connected across the resistor R43. One terminal of the primary winding 358 of transformer T31 is connected to the conductor 352 and therethrough to the bus B3 and the other terminal of the winding 358 is connected through an impulse capacitor C13 and conductor 360 to the anode of the valve V4 so that the voltage established across the resistors R11 and R12 as a consequence of the conduction of the valve V4 will cause a current pulse or surge to be supplied to the transformer T31 whereby a potential will be established across the resistor R43 of a polarity to overcome the blocking bias potential maintained by resistor R41 to cause the valve V26 to conduct.

The initiation of conduction of the valve V27 is timed with respect to the voltage cycles appearing between the lines L1 and L2 by the pulsating direct current voltage supplied across resistor R44 from the full wave rectifying network 362 which has its alternating current terminals connected to the secondary winding of a transformer T31a, the primary winding whereof is connected between the lines L4 and L5. The terminals of the resistor R44 are connected between the direct current output terminals of the network 362. Insomuch as no energy storage devices are provided across these direct current output terminals of the network 362, a series of unidirectional pulsating voltage pulses will be established across resistor R44 in timed relationship to the voltage waves between the lines L1, L2. The polarity of this voltage is so chosen that when R44 is energized from the network 362 its terminal 364, which is connected by conductor 366 and usual current limiting resistor to the shield grid of the valve V27, will be negative with respect to its terminal 366 which is connected by conductor 368 to the terminal 342 and through resistor R40, conductor 346 and contacts CR6a to the cathode of the valve V27. The voltage established across the resistor R44 during a greater portion of the voltage wave between lines L1 and L2 will override the conducting bias voltage supplied between the shield grid and cathode of the valve V27 by the resistor R40 so that the valve V27 can only initiate conduction during an early portion of each half cycle of the voltage wave between the lines L1 and L2.

The control grid of the valve V27 is connected through a resistor R45 and the tapped resistor section SW3d of the switch SW3 to the movable arm of switch section SW1m of switch SW1. The terminal engaged by the arm of the switch SW1m with the switch SW1 in its No. 1 position is connected by conductor 370 through tapped resistor section SW5f of switch SW5 and conductor 372 to the adjustable tap 338 of the potentiometer resistor R35. The terminals engaged by the movable arm of the switch section SW1m when the switch SW1 is in its No. 2, 3, and 4 positions is connected by conductor 374 through tapped resistor section SW6d of switch SW6 to the conductor 372 and therethrough to the adjustable tap 338. The end of the potentiometer resistor R35 connected to the anode of the valve V27 is connected to one terminal 375 of a timing capacitor C14, the other terminal whereof is connected to the controlling grid of the valve V27. The anodes of the valves V26 and V27 are connected together by the usual commutating capacitor C15.

During nonconductive periods of the valve V26, the valve V27 conducts and the capacitor C14 charges by the grid conduction of the valve V27. When the valve V26 is rendered conductive the commutating capacitor C15 temporarily lowers the anode potential of the valve V27 to a potential below that of the cathode and the valve V27 is extinguished. Conduction of valve V26 effectively connects the terminal 375 of capacitor C14 to the cathode of valve V27 and the valve V27 is then held blocked by the potential appearing across the capacitor C14 for a predetermined time interval which is determined by the rate of discharge of the capacitors C14 through the timing resistors embodied in the sections SW3d, SW5d and SW6d of the switches SW3, SW5 and SW6. This conduction and nonconduction of the valve V27 controls the flow of current through resistors R36, R37 and R38 which control the conductivity of the valves V30—V35.

The transformers T27, T28 and T29 are, of phase shift network 24, each provided with center tapped secondary windings 376, 378 and 380 respectively. The outer terminals of the windings 376, 378 and 380 are respectively connected to the anodes of the valves V30—V31, V32—V33, and V34—V35. The center tap terminal of the windings 376, 378 and 380 are respectively connected to each of the cathodes of the valves V30—V31, V32—V33, and V34—V35.

The firing transformers T26, T24 and T25 are, respectively, associated with the valves V30—V31, V32—V33 and V34—V35. The transformers T26, T24 and T25 are each provided with a secondary winding having output terminals between which are connected a pair of series connected resistors. Each pair of the resistors has a common terminal. One end of resistor R36 is connected to the common terminal of the resistors associated with the transformer T26, one end of the resistor R37 is connected to the common terminal of the resistors associated with the transformer T24 and one end of the resistor R38 is connected to the common terminal of the resistors associated with the transformer T25. The opposite end of resistor R38 is connected to the end of resistor R37 which is connected to the common point of the resistors associated with the transformer T24. The other end of resistor R37 is connected to the end of resistor R36 which is connected to the common point of the resistors associated with the transformer T26. The other end of the resistor R36 is connected to the bus B9. The end of the resistor R38 connected to the common point of the resistors associated with the transformer T25 is connected to the conductor 340.

The controlling grids of the valves V30, V32 and V34 are connected respectively through current limiting resistor to corresponding terminals of the transformers T26, T24 and T25 while the controlling grids of the valves V31, V33 and V35 are connected respectively through current limiting resistors to the other corresponding terminals of the transformers T26, T24 and T25. The common points of the resistors associated with the transformers T26, T24 and T25 are respectively connected to the cathodes of the valves V30—V31, V32—V33 and V34—V35 through resistors R66, R37, and R38. The resistors R36, R37 and R38 are connected in series of the anode circuit of the normally conducting valve V27 and are arranged in a polarity to maintain the valves V30—V31, V32—V33, and V34—V35 nonconducting by overriding the firing potential applied across the pairs of resistors associated with the transformers T26, T24 and T25.

As a consequence of the valve V26 becoming conductive, the valve V27 becomes nonconductive and the potential caused by conduction of valve V27 disappears from the resistors R36, R37 and R38 to permit the firing transformers T26, T24 and T25 to respectively cause the valves V30—V35 to be rendered conductive. The phasing of the voltages applied to the primary windings of the transformers T26, T24 and T25 from the network 24 with respect to the voltages applied to the transformers T27, T28 and T29 is such that these valves V30—V35 become conductive somewhat before a positive anode potential is applied thereto during the period in which the valve V27 is not conducting. The valves V30—V35 will be periodically rendered either fully conductive or completely nonconductive to effectively short circuit or open circuit the secondaries of the transformers T27, T28 and T29 to alter the impedance thereof to phase shift the output voltages of network 24 supplied to the indexing network 20.

In order to render the amount of phase shift afforded by the network 26 adjustable, the impedance between the conductors 304—308, 316—320 and 330—334 is made adjustable and not merely varied between the minimum impedance of the transformers T27, T28 and T29 which occurs when their secondary windings 376, 378 and 380 are shorted through the fully conductive valves V30—V35 and the maximum impedance of these transformers when their secondary windings are open circuited by the nonconducting valves V30—V35. Tapped resistor sections SW9a, SW9b and SW9c of switch SW9 respectively are connected in shunt across the primary windings 306, 318 and 332 of the transformers T27, T28 and T29, respectively. With the switch SW9 set at a position to provide maximum impedance and with the valves V30—V35 nonconducting, the voltage applied to the anodes of valves V9, V10, V13, V14, V17 and V18 will be phase shifted the maximum extent in the lagging direction. If the valves V30—V35 remain nonconductive, movement of the switch SW9 to reduce the impedance values of its sections will reduce the amount of phase lag of the anode voltage applied to the network 20. For purposes which will become apparent hereinafter, it is not desirable to reduce the impedance of the sections below a minimum value in which the voltage drop thereacross is equal to or slightly greater than the voltage drop across the primary windings of the transformers T27, T28 and T29 which is necessary to sustain conduction in the valves V30—V35.

Instead of utilizing a switch SW9 in which means is provided for limiting the reduction of the impedance provided by its sections to this minimum value, this minimum value of impedance is placed in series with the resistance sections SW9a, SW9b and SW9c respectively as resistors R52, R53 and R54 and the switch SW9 is arranged to reduce the impedance of its resistor sections to zero value. This arrangement makes it possible to arrange contacts CR6b, CR6c and CR6d in shunt relation with the resistor sections SW9a, SW9b and SW9c respectively so that if no tailing current is desired relay CR6 may be energized to shunt out the sections of switch SW9 so that the tailing current will be of the same magnitude as the pulse current without the necessity of adjusting the switch SW9 to its 100% tailing current position. With this arrangement, as far as phase shifting of the network 24 is concerned, there will be no substantial difference in the phase of the output voltage of network 24 as a result of the valves V30—V35 being rendered conductive when the switch SW9 is set at 100% tailing current position, or the contacts CR6b, CR6c and CR6d being closed. This makes it possible to supply a substantially fixed amount of power to the electrodes E throughout the conductive periods of valves V6 and V8 at a given setting of switches SW7 and SW8 under either of the following conditions: (1) with the switch SW4 set at its No. 1 position to energize relay CR6 to maintain valves V30—V35 conductive and the sections of switch SW9 shorted, or (2) with the switch SW9 set at its 100% tailing current position either with the valves V30—V35 conducting or nonconducting.

The timing of the network 26 is regulated by the rate of discharge of the timing capacitor C14. This rate is proportioned to the timing afforded by the network 14 so that the valve V27 is rendered conductive at a fixed time subsequent to the rendering of valves V3 and V4 conductive during full cycle operation and to the rendering of valve V3 conductive during half cycle operation so that at the desired time in each half cycle of energy being supplied to the welding electrodes E, the power supplied thereafter during the latter portion of this half cycle is a desired percentage of the power supplied during the pulse or initial portion of the half cycle. During full cycle operation, the switch SW1 is turned to its No. 1 position and the relay CR7 will be energized thus rendering the pulses supplied from both the transformers T30 and T31 effective to initiate conduction of the valve V26 which conducts once for each half cycle of energy flowing to the welding electrodes E. With the switch SW1 set in its No. 2, 3 and 4 positions, the transformer T31 is ineffective to supply pulses and the network 26 is responsive to the transformer T30.

At a predetermined time subsequent to conduction of valves V26, the capacitor C14 will discharge sufficiently to permit the valve V27 to conduct under control of network 362 in timed relation to the voltage appearing between the lines L1 and L2 to block the valves V30—V35 for phase shifting of the voltage supplied to the network 20 to reduce the power supplied to the electrodes E during the latter portion of the half cycle then in progress. During full cycle operation, the timing afforded to the network 26 by the tapped resistor sections SW5f and SW3d is such that the valve V27 is rendered conductive during the time period in which current is flowing through either ignitron IG1 or ignitron IG4, depending upon whether the valve V26 had been rendered conductive as a consequence of the pulse supplied by the transformer T30 or T31. Due to the leading voltage supplied by the transformer T26, the valves V30 or V31 will have already been rendered in a conductive condition so that the ignitrons IG1 or IG4 will be rendered conductive to supply the high power. However, the valves V32, V33, V34 and V35 will be rendered nonconductive prior to firing of the ignitrons IG2—IG3 or IG5—IG6 so that these latter sets of ignitrons will supply the lower power or tailing current to the electrodes E.

As has been previously discussed in a general manner, the ignitrons IG1 and IG4 are arranged to act as inverters during full cycle operation, the ignitron IG1 actifiing to invert between a positive and negative half cycle and ignitron IG4 acting to invert between the negative and positive half cycle voltage being applied between the welding electrodes E. This inverter circuit comprises a network 400 which includes the beforementioned valves V36, V37 and transformers T12 and T19. One terminal of the primary winding 220 of the transformer T12 is connected by conductor 401 to terminal 402 at the common junction of the secondary windings 278 and 280. The other terminal of the winding 220 is connected through a current limiting resistor R55 to the anode of the valve V36. The cathode of the valve V36 is connected by conductor 404 to the terminal 286. The anode of valve V37 is connected through a current limiting resistor R56 and primary winding 268 of transformer T19 to the conductor 404 and therethrough to the terminal 286. The cathode of this valve is connected by conductor 406 to the conductor 401 and therethrough to the terminal 402.

The valves V36 and V37 are respectively normally held nonconductive by blocking bias potentials applied individually across resistors R57 and R58 respectively from secondary windings 408 and 410 of transformers T32 and T33 respectively. The primary windings 412 and 413 of these transformers are each connected between the lines L4 and L5. In order to assure a fairly uniform direct current bias voltage appearing across the resistors R57 and R58, capacitors C16 and C17 are arranged respectively in parallel therewith and rectifiers 414 and 416 are provided in series with the windings 408 and 410 respectively. The positive terminal 418 of the resistor R57 is directly connected to the cathode of the valve V36 and the negative terminal 420 thereof is connected through R59 and the usual current limiting resistor to the control grid of the valve V36. One terminal of the winding 218 of transformer T11 of network 20 is connected by conductor 422 to the terminal 424 of the resistor R59 which is nearest the control grid of the valve V36. The other terminal 425 of the resistor 459 is connected through a rectifier 426 and conductor 428 to the opposite terminal of the winding 218. A capacitor C16a is connected in parallel with the resistor R59. The polarity of the rectifier 426 is such that with the winding 218 energized the terminal 424 will be positive with respect to the terminal 425. The potential across resistor R59 is sufficient magnitude to overcome the blocking bias potential afforded by the resistor R57 to render the valve V36 conductive.

The energization of the transformer T11 occurs during the time that valve V17 is conducting and which is during the time that the ignitron IG3 is conducting. The anode potential for the valve V36 is in phase with the potential appearing across the lines L2, L3 so that the valve V36 will not become conducting to energize the transformer T12 for firing the valve V11 and its ignitron IG1 until very late in the half cycle of conducting potential which appears across the ignitron IG1.

The control circuit for the valve V37 is similarly arranged but the conductive overriding bias potential is controlled by means of the winding 266 of the transformer T18 so that the valve V37 is conductive to energize transformer T19 to fire the valve V12 very late in the half cycle in which there is a positive to negative potential appearing between the anode and cathode of the ignitron IG4.

It is believed that the remainder description may best be brought out in connection with a description of the operation of the apparatus, which operation is as follows. Assume that switch SW1 is in its No. 1 position which provides for full cycle operation, and switches SW3, SW4, SW5, SW10 and SW11 are in their illustrated positions. Upon closure of the line switch LS1, electrical potential is applied between the lines L1, L2 and L3.

This immediately energizes the transformers T2, T21, T22, T23, T24, T25, T26, T27, T28, T29, T50, T52, T53, the transformer having the primary winding 325, and other transformers (not shown) which are connected through conventional circuits for energization of the heating elements (not shown in the interest of simplifying the drawings) of the various valves requiring the same whereby these valves will be brought to operating temperatures. Energization of the transformer T2 causes its secondary winding 174 to apply an alternating control potential between the lines L4 and L5 which is in fixed phase relation with respect to the potential between lines L1, L2 and L3. Energization of lines L4 and L5 energizes the control winding 170 of the time delay relay TDR which, after a predetermined time interval during which the valves are heated to their operating temperature, will close its contacts TDRa, completing a circuit from the line L4 through the closed contacts of the coolant flow switch SW10 (it being assumed that the coolant has previously been turned on and is flowing through the various devices to be cooled), through the closed contacts of the weld no-weld switch SW11 (which is assumed to be in its closed or welding position), the contacts TDRa, the winding 166 of the control relay CR8 to the line L5. This will cause the relay CR8 to open its contacts CR8a without effect since its circuit is open at SW1c. Closure of the contacts TDRa also established a circuit from the line L4 through the switches SW10, SW11 and through the conductor 168 and through switch sections SW1a and SW1b to energize the control windings of the relays CR1, CR3 and CR4, which are connected between the control arms of the switch sections SW1a and SW1b and the line L5.

Energization of transformer T2 also energized the transformers associated with the rectifying networks 28, 62 and 336 so that direct current potential is applied between the busses B1—B2, B3—B4 and B9—B10, as well as energizing transformers T1, T5, T7, T13, T14, T32, T33, T34, T35, T36, T60, T61 and T62 and the network 178.

Establishment of the potential between the busses B1 and B2 results in the conduction of the valve V2 due to the peaking voltage supplied by tarnsformer T1 which overrides the blocking bias established on valve V2 by resistor R4. The capacitors C1 and C2 are then charged by conduction of the valve V2. The valve V1 is held blocked by the potential bias supplied from the resistor R4 and will not become conductive until it is overridden by a conducting bias supplied by conductors 38 and 40 from the sequence network 6 of FIGURE 2. Energization of the busses B3 and B4 results in conduction of the valve V4 and the charging of the capacitors C4 and C6. The valve V3 is now held blocked by the potential established across the resistor R2 associated with the now conducting valve V2. Energization of the busses B9 and B10 result in the conduction of valve V27 and the charging of capacitors C14 and C15. The resistor R41 applies a blocking bias potential to the valve V26 which is thereby prevented from conducting. Conduction of the valve V27 energizes the resistors R36, R37 and R38 which apply blocking bias potentials which override the firing potentials established by the transformers T26, T24 and T25 to the valves V30—V35 and hold them nonconductive.

Energization of transformer T5 supplies anode potential to valves V5, V6, V7 and V8. Since at this time the valve V3 is not conducting and the capacitor C10 will have been charged, no blocking biases are applied to valves V5 and V6 and they will conduct to charge the capacitors C7 and C7a which will apply blocking potentials to valves V7 and V8 which will be held nonconductive. Energization of the network 178 to establish a potential across resistor R28 establishes a blocking bias potential across the valves V9, V13 and V17 which are held nonconductive even though the transformers of network 24 are energized to supply anode potential thereto. Energization of transformers T13 and T14 energizes network 224, 226 and 228 to hold valve V10, V14 and V18 blocked. Energization of transformers T34, T35 and T36 places a blocking bias potential on, and holds, valves V11, V12, V15, V16, V19 and V20 nonconductive. Energization of the transformers T32 and T33 apply blocking potentials to and hold the valves V36 and V37 nonconductive.

Referring now to FIGURE 2 which shows the sequencing network 6, energization of the transformer T50 resulted in its secondary winding 500 applying an alternating potential between the lines L11 and L12 whereby the resistors R70 and R70a are energized to maintain the line L14 at a potential which is slightly positive with respect to L12 during the half cycles in which line L11 is positive with respect to line L12. The anode of valve V51 is connected through a squeeze time network 504 to the line L11 and the cathode of this valve is directly connected to the line L12. Therefore, energization of the lines L11 and L12 results in conduction of the valve V51 to charge the capacitor C26 of the network 504. Valve V50 has its anode connected through the primary winding 526 of transformer T55 to the line L12 and its cathode directly connected to the line L11 but the controlling grid of the valve V50 is connected through a network 501 to the anode end of the network 504 whereby a blocking bias is maintained between the controlling grid and cathode of the valve V50 so that the valve V50 is held blocked.

Energization of the transformer T52 resulted in the energization of the rectifying network 506 for energizing the positive and negative direct current busses B15 and B16 which supply anode potential to the valves V52 and V53. Due, however, to the now open condition of the contacts CR15c of the relay CR15, the anode circuit to the valves V52 and V53 is interrupted and they cannot conduct. Additionally the valves V52 and V53 are held nonconductive by the direct current bias potentials established by the networks 532 and 538 which are respectively polarized to apply a direct current blocking bias voltage between the control grids and cathodes of the valves V52 and V53.

Anode transformer T53 associated with the valve V54 has one end of its secondary winding 507 directly connected to the anode of the valve V54 and its other end connected through the hold time network 508, line L14, resistor R70, line L12 and conductor 544 to the cathode of the valve V54. The controlling grid of the valve V54 is connected through the usual current limiting resistor, conductor 545, a resistor R74, conductor 541, line L14, resistor R70, line L12 and conductor 544 to the cathode of the valve V54. The voltage drop across the resistor R74 is controlled by the conductivity of the valve V53 and, since this valve V53 is not conducting, the grid of the valve V54 will be slightly positive with respect to the cathode of this valve due to the voltage drop across the resistor R70 and valve V54 will conduct.

Due to the conduction of the valve V54 the capacitor C27 of the network 508 will be charged and, since the network 508 is connected between the controlling grid and cathode of the valve V55 through the resistor R70 and is polarized to maintain a negative or blocking bias potential between the controlling grid and cathode of the valve V55, valve V55 will be held nonconductive. However, at this time the anode transformer T57 which is connected between the lines L12 and L13 will be de-energized due to the now open condition of the switch SW20 and contacts CR15a of the relay CR15.

The valve V56 has its cathode connected to the line L12 and its controlling grid connected through the usual current limiting resistor and conductor 552 to the terminal 550 of the off-time network 548 associated in the anode circuit of the valve V55. Since the capacitor C29 in this network is not at this time charged, a slightly positive bias potential will be maintained between the controlling grid and cathode of the valve V56 by the resistor R70. The anode of the valve V56 is connected to the line L13 through two parallel circuits; one of which contains the energizing winding 510 of the relay CR15 and the other of which contains the primary winding 514 of a transformer T54, switch SW22 and pressure switch SW21. Since no potential at this time is being applied to the line L13, the anode circuit of the valve V56 will be interrupted and this valve will be nonconducting although it is in a condition to conduct upon the application of a proper potential to the line L13.

The anode circuit for the valve V52 extends from the bus B15 through contacts CR15c, conductor 533, primary winding 534 of a transformer T56 and a capacitor C28 to the anode of the valve V52. The cathode of this valve is directly connected to the bus B16. The anode circuit of the valve V53 extends from the conductor 533 through the resistor R74, the conductor 545, and current limiting resistor R75 to the anode of the valve V53. The cathode of the valve V53 is connected to the anode V52 by the conductor 540.

Conductors 38 and 40 of FIGURE 1A are connected across the output terminals of the secondary winding 536 of the transformer T56 so that upon initial conduction of the valve V52 and charging of the capacitor C28 the transformer T56 will supply a voltage pulse between the lines 38 and 40 for applying a conducting bias between the controlling grid and cathode of valve V1.

Referring now to FIGURE 3 which shows the forge delay network 8, energization of the transformer T60 resulting from energization of the lines L4 and L5 energizes the rectifying network 600 to energize the positive and negative busses B21 and B22 of the anode potential supply for the valve V60. Energization of transformer T61, also resulting from energization of the lines L4 and L5, energizes the rectifying network 602 to apply a positive and negative potential between the positive and negative busses B23 and B24 of the anode potential supply for the valve V61. Since the circuit from the bus B21 to the anode of the valve V60 through the solenoid controlling valve 604 is now broken by the normally open contacts CR25a, the valve V60 will not conduct. Since the circuit between the bus B23 and the anode of the valve V61 is also broken by the normally open contacts CR25b of the relay CR25, the valve V61 will not conduct and the bank of resistors R100 will not be energized. With the relay CR25 in its normally de-energized position, its contacts CR25c will be closed and the timing capacitor C100 will have discharged through the resistor R101.

When it is desired to initiate an operation, the switch SW20 (FIG. 2) is closed to connect line L13 to the line L11 for completing the anode circuit of the normally conductive but nonconducting valve V56. This circuit extends from the line L11 through switch SW20, line L13, the energizing winding 510 of the control relay CR15, anode to cathode of the valve V56 to the line L12. Conduction of valve V56 causes the relay CR15 to close its normally open contacts CR15a, CR15b and CR15c. Closure of the contacts CR15a establishes a holding circuit around the switch SW20 which may now be released to open position without effecting the operation then in progress. Closure of contacts CR15c connects the conductor 533 to the bus B15 but due to the now blocked condition of the valves V52 and V53 they will not conduct. Closure of the contacts CR15b completes an obvious energizing circuit for the energizing winding 512 of control relay CR16 causing it to open its normally closed contacts CR16a and to close its normally open contacts CR16b and CR16c. Opening of the contacts CR16a is without effect with respect to operation of the relay CR2 (FIGURE 1A) due to the assumed position of the switch SW1. Closing of the contacts CR16b establishes a circuit, not shown, for energizing a fluid controlling solenoid (not shown but which could, for example, be the solenoid valve 106 of the said Clark Patent No. 2,331,537), which controls flow of fluid to a pressure ram for moving the electrodes E against the work W in the normal manner of welding machine operation. Closure of the contacts CR16c completes a circuit between the conductors 606 and 608 which lead to the forge delay network shown in FIGURE 3 and for a purpose which will be described hereinafter.

When the fluid admitted to the ram (not shown) reaches a predetermined pressure, the pressure switch SW21 will close to complete a circuit from the line L13 through the now closed contacts SW21, the closed contacts of the weld no-weld switch SW22 (assumed to be in the position shown which is the weld position), the primary winding 514 of transformer T54 and valve V56 to the line L12. This causes the secondary winding 516 of the transformer T54 to establish a blocking bias potential across the network 518 which overrides the normally conducting bias potential applied between the grid and cathode of the valve V51 by resistor R70 to block the valve V51. This potential is applied by means of a circuit which extends from one terminal of the winding 516 through the line L12, resistor R70, line L14, network 518, terminal 522, and rectifier 524 back to the other side of the winding 516. The terminal 522 is connected through the usual current limiting resistor to the control grid of the valve V51 and as before stated the cathode of valve V51 is connected to line L12.

Blocking of the valve V51 causes the timing capacitor C26 to discharge at a timed rate through the resistor R71 to measure out squeeze time or the time during which the electrodes E are pressing against the work W prior to the flow of welding current. At the end of this predetermined squeeze time interval, the direct current blocking bias potential applied by the network 504 between the controlling grid and cathode of the valve V50 will have decreased sufficiently so that the next beginning of a positive half cycle of voltage between the lines L1 and L2, the clipping network 501 will cause the valve V50 to be rendered conductive substantially at the beginning of such positive half cycle of voltage. Network 501 comprises a resistor R80 and a capacitor C25 connected in series across the secondary winding of the transformer T51. The values of the capacitor C25 and resistor R80 are proportioned so that the alternating potential of the network 501 leads the potential of lines L1 and L2 by just less than 180 electrical degrees.

Conduction of the valve V50 completes a circuit from the line L12 through primary winding winding 526 of control transformer T55, and anode to cathode of the valve V50 to the line L11. Energization of the transformer T55 causes its secondary winding to supply a rectified voltage between the positive and negative conductors 528 and 530 which overrides the blocking bias voltage established by the network 532 to permit the valve V52 to conduct. Conduction of the valve V52 completes a circuit from the bus B15 through the now closed contacts CR15c and through the primary winding 534 of control transformer T56, capacitor C28, anode to cathode of valve V52 to the bus B16. The flow of current through the winding 534 for charging the capacitor C28 causes a voltage pulse to be induced in the secondary winding 536 of the transformer T56 which is applied by the conductors 38 and 40 between the controlling grid and cathode of the valve V1 (FIGURE 1A) to override the blocking bias voltage normally applied between the grid and cathode of the valve V1 by the resistor R4 whereby the valve V1 immediately conducts. Conduction of valve V52 is maintained by the "keep alive" resistor in parallel connection with the winding 534 and capacitor C28.

Nothing further occurs in the sequencing network 6 until valve V53 is rendered conductive to initiate the network 6 to continue with "hold" and "off" times. Valve V53 is rendered conductive by a voltage pulse supplied thereto by the conductors 155 and 157, from the power converting network 4 at the end of the weld interval. This pulse when applied by the conductors 155 and 157 overrides the blocking bias potential normally placed between the controlling grid and cathode of the valve V53 by the network 538. For the present it is assumed that the inverter network 4 has applied the overriding pulse to the valve V53 and the valve V53 is conducting. Conduction of valve V53 completes a circuit from the bus B15 through the now closed contacts CR15c, resistor R74, conductor 545, resistor R75, anode to cathode of the valve V53, conductor 540, anode to cathode of the valve V52 back to bus B16.

One terminal 542 of the resistor R74 is connected through the line L14, the resistor R70, line L12, and conductor 544 to the cathode of the valve V54. The other terminal 546 of the resistor R74 is connected through conductor 545 and the usual current limiting resistor to the controlling grid of the valve V54. Resistor R74, when so energized, places a blocking bias between the control grid and cathode of the valve V54 thereby blocking this valve and permitting the capacitor C27 of the network 508 to discharge through the resistor R72 to measure out the hold time. At the end of a predetermined hold time period as determined by the setting of the resistor R72, the blocking bias voltage applied by the network 508 between the control grid and cathode of valve V55 is so reduced that the valve V55 conducts. Conduction of the valve V55 energizes the off time network 548 thereby charging the capacitor C29 thereof. Network 548, when energized, applies a blocking bias potential between the control grid and cathode of the valve V56 to render it nonconducting. More specifically, the terminal 550 of the network 548 is connected by means of conductor 552 through a current limiting resistor to the control electrode of the valve V56. The other terminal 552 of the network 548 is connected through the resistor R70 and line L12 to the cathode of the valve V56.

Blocking the valve V56 de-energizes the winding 510 of the relay CR15 whereby its contacts CR15a, CR15b and CR15c open. Assuming that at this time the switch SW20 is closed, opening of the contacts CR15a is without effect, opening of the contacts CR15b de-energizes the winding 512 of the control relay CR16, and opening of the contacts CR15c breaks the anode circuit for the valves V52 and V53 to prevent their further conduction. De-energization of the winding 512 of relay CR16 caused its contacts CR16a to close and its contacts CR16b and CR16c to open. Closure of contacts CR16a is without effect with switch SW1 in its No. 1 position. Opening of contacts CR16b de-energizes the ram solenoid (not shown), thereby permitting the electrodes E to separate. Opening of the contacts CR16c acts to de-energize the relay CR25a of the forge delay network 6 for purposes which subsequently will be described.

Blocking of the valve V56 also de-energizes the transformer T54, thereby removing the blocking bias potential between the grid and cathode of the valve V51 which thereupon conducts. Conduction of the valve V51 charges the squeeze time network 504 to place a blocking bias potential on the valve V50. Blocking of the valve V50 de-energizes the transformer T55 whereby the network 532 is effective to place a blocking bias potential between the controlling grid and cathode of the valve V52. When the anode circuit to the valve V53 was opened, the blocking bias potential applied by the resistor R74 to the valve V54 was removed and the valve V54 became conducting and energized the network 508 which placed a blocking bias voltage across the valve V55. The rendering of this valve V55 nonconducting initiated the timing out of the capacitor C29 through the resistor 551 of the off time network 548. At the end of the off time, the blocking bias potential applied by the network 548 between the cathode and grid of the valve V56 disappears and if, as above indicated, the switch SW20 remains closed, valve V56 will reconduct and the network 6 will repeat the described operation. If, however, the switch SW20 is open, the opening of contacts CR15a will act to de-energize the line L13 which would have immediately rendered valve V55 nonconducting to initiate the timing out of the network 548, but otherwise the network 6 would reset itself substantially as described with switch SW20 closed. At the expiration of the time out period, reclosure of the switch SW20 would initiate a new operation of network 6 similar to the one just described.

Referring to the operation of the network 4, conduction of the valve V52 caused a voltage pulse to be applied by the conductors 38 and 40 to override the blocking bias normally maintained on the valve V1 by the resistor R4, thereby causing the valve V1 to conduct at an early portion of the half cycle of voltage between lines L1 and L2 in which line L1 is positive with respect to line L2. Conduction of the valve V1 causes the normally conductive valve V2 to become extinguished due to the transitory lowering of its anode to a potential below that of its cathode. When the valve V2 is rendered nonconductive, the potential appearing across the timing capacitor C2 then acts through valve V1 to hold valve V2 nonconductive for a predetermined time interval during which capacitor C2 discharges through the timing resistor R5. The time of discharge of the capacitor C2 through the resistor R5 to a potential in which the valve V2 can reconduct determines the weld time. With switch SW1 in its No. 1 position, the winding 154 of relay CR7 will be energized and its contacts CR7a will be closed to connect winding 56 of transformer T3 to the conductors 155 and 157 so that upon reconduction of the valve V2 at the end of weld time the valve V53 will be rendered conductive to initiate hold time. With relay CR7 energized, its contacts CR7b will be open to disconnect winding 158 of transformer T31 from conductors 155 and 157.

Blocking of the valve V2 de-energized its anode resistor R2, thereby removing the blocking bias potential normally applied thereby between the control grid and cathode of the valve V3. The next positive voltage pulse of the winding 92 of transformer T4, with the relay CR1 energized to close its contacts CR1a and CR1d and to open its contacts CR1b and CR1c, will be early in the voltage cycle in which the line L1 is positive with respect to line L2. The relays CR1, CR3, and CR4 were energized with switch SW1 in its No. 1 position upon closure of the time delay relay TDR. Relays CR3 and CR4 upon being energized closed their contacts CR3a, CR3b, CR3c, CR3d, CR4a, CR4b, CR4c and CR4d. Closure of contacts CR3a and CR4a is without effect at the No. 1 setting of switch SW1. Closure of contacts CR3b, CR3c and CR3d completed the anode circuits for the firing valves V11, V15 and V19 while closure of contacts CR4b, CR4c and CR4d completed the anode circuits for the firing valves V12, V16 and V20.

Conduction of the valve V3 establishes a potential drop across the resistors R8, R9 and R10. The drop across the resistor R9 is applied between the controlling grid and cathode of the valve V5 to block this valve to permit the capacitor C7 to discharge through the tapped resistor section SW5d of the interpulse timing switch SW5. The taps on this switch are arranged so that the capacitor C7 will discharge at different rates. With the switch SW5 set at its No. 1 position, the capacitor C7 will discharge sufficiently to permit valve V7 to conduct in approximately the time required for one cycle of the voltage between lines L1 and L2. Each resistor section SW5d adds one more cycle of time to the time for discharging the capacitor C7 to this reduced potential.

The valves V5 and V7 are reversedly arranged across the winding 104 of transformer T5 so that valves V5 and V7 conduct during opposite half cycles of voltage. The phasing of the transformer T5 is such that the anode of valve V5 is negative with respect to the cathode during the period that the line L1 is positive with respect to the line L2. Therefore, conduction of the valve V3 and the applying of the blocking bias potential between the controlling grid and cathode of the valve V5 due to the voltage drop across the resistor R9 will occur during the conconducting half cycle of the valve V5. At this instant the anode of valve V7 is positive with respect to the cathode but, however, the valve V7 is held blocked due to the blocking bias established between its controlling grid and cathode by the charge on the capacitor C7. With the interpulse timing switch SW5 set as shown the discharge rate of the capacitor C7 wil be sufficiently rapid so that two cycles later when the line L1 is positive with respect to line L2, and the anode of valve V7 is positive with respect to the cathode, the valve V7 will conduct. Because of the operation of the clipper network 120 valve V7 conducts for complete half cycles or remains nonconductive. Conduction of valve V7 energizes the transformer T6 and its secondary winding 194 energizes the resistor R25 whereby a potential is established thereacross which overrides the blocking bias potential established between the controlling grid and cathode of the valve V9 by the resistor R28 rendering the valve V9 in a conductive condition. This valve V9 will conduct at a phase angle with respect to the voltage between the lines L1 and L2 as determined by the setting of the fine and coarse phase adjusting or heat controlling switches SW8 and SW7 which controls the phase of the anode voltage supplied thereto.

Conduction of the valve V9 energizes the transformer T9 which has one of its secondary windings 200 connected in the grid controlling circuit for the valve V11. When energized, the winding 200 applies a potential which overrides the blocking bias potential normally applied between the grid and cathode of the valve V11 by the resistor R60 energized from the secondary winding 430 of the transformer T34. The primary winding 432 of this transformer T34 is connected between the lines L1 and L2. The anode of the valve V11 is connected to the anode of ignitron IG1 through the now closed contacts CR3b and the cathode of the valve V11 is connected to the igniter of the ignitron IG1 through a fuse F1 so that upon rendering of the valve V11 conductive, it will conduct to energize the igniter of the ignitron IG1. Upon being rendered conductive ignitron IG1 conducts to supply electrical current from the line L1 through the ignitron IG1, the primary winding 434 of the welding transformer WT and through conductor 436 to the line L2.

The transformer T9 has a second secondary winding 202 which, when energized, establishes a potential across the resistor R26 which overrides the normal blocking bias potential established between the controlling grid and cathode of the valve V13 by the resistor R28 so that the valve V13 is rendered conductive. This valve, like the valve V9, will conduct at the proper phase angle as established by the heat controlling switches SW7, SW8 to energize the transformer T10. One secondary winding 208 of transformer T10 is connected into the controlling circuit for the valve V15 for rendering this valve conductive to fire the ignitron IG2 to supply electrical current from the line L2 through the primary winding 438 of the transformer WT and through conductor 440 back to the line L3. A second secondary winding 210 of the transformer T10 renders the valve V17 conductive which then conducts at a phase angle likewise determined by the setting of the switches SW7 and SW8 to energize the transformer T11. One secondary winding 216 of the transformer T11 is arranged to render valve V19 conductive for firing the ignitron IG3 to supply electrical current from the line L3 through the third primary winding 442 of the transformer WT and conductor 444 back to the line L1. The transformer T11 has its second secondary winding 218 arranged in the grid controlling circuit of the valve V36.

Energization of this winding 218 energizes the resistor R59 to provide a conducting bias potential which will override the blocking bias potential established by the resistor R57 to render valve V36 conductive. Due to the phasing of the anode voltage supplied to the valve V36, it will conduct at a very late portion in the cycle of voltage in which the line L1 is positive with respect to the line L2.

If the valve V7 is still conducting, the conduction of the valve V36 and the consequent energization of the transformer T12 is without effect since prior thereto the valve V9 will have again become conductive to energize the transformer T9 whereby the secondary winding 200 will have rendered valve V11 conductive to fire the ignitron IG1. If the valve V4 has again become conductive and the valve V7 has been rendered nonconductive, the valve V9 will have been rendered nonconductive and the transformer T9 will not have been energized. Under these conditions conduction of the valve V36 and consequent energization of the transformer T12 causes its secondary winding 222 to render the valve V11 conductive at a very late point of the voltage half cycle in which line L1 is positive with respect to line L2. This renders the valve IG1 conductive to supply current to the winding 434 in a direction to oppose the collapsing of flux in the core of the transformer WT due to the decreasing current flow through the ignitron IG3 and winding 442 and will reverse the polarity of the electrodes of the ignitron IG3 to extinguish the same. The ignitron IG1 continues to conduct current as the polarity of the lines L1 and L2 reverse due to the inductive characteristic of the load impressed on the transformer WT. Since the ignitrons IG1 and IG4 are connected across the same conductors no transformer short circuiting can result whether the ignitron IG4 is rendered conductive during or subsequent to the termination of current flow through the ignitron IG1.

Valve V4 will reconduct a predetermined time after conduction of valve V3 as determined by the setting of the switches SW3, SW4 and SW5 and the phasing of the winding 98. The phasing of the peaking transformer secondary winding 98 is such that the valve V4 will be rendered conducting during an early portion of the next voltage half cycle in which the line L2 is positive with respect to the line L1 subsequent to the timing out of the capacitor C4. Reconduction of valve V4 blows out valve V3 and permits reconduction of the valve V5 to charge the capacitor C7 to block V7, the potential drop across the resistor R23, tapped resistor sections SW3c, SW4c, and SW5c of the pulse tailing and interpulse switches SW3, SW4 and SW5 caused by the potential drop appearing across a portion of the resistor R11 and the consequent flow of charging current to capacitor C10 is applied as a blocking bias potential between the control grid and cathode of the valve V6. This potential blocks the valve V6 and permits the capacitor C7a to discharge similarly to capacitor C7 to permit conduction of the valve V8. The phasing of the transformer T5 is such that at the time this blocking potential is applied to valve V6 its anode is negative with respect to its cathode and the valve V6 is held against further conduction to permit discharge of the capacitor C7a.

With the interpulse switch SW5 set at its No. 2 position, as shown, the valve V8 will conduct during the second subsequent half cycle in which the anode of valve V8 is positive with respect to its cathode. Conduction of valve V8 energizes transformer T15 to render the valve V10 conductive. Valves V10, V12, V14, V16, V18, V20 and V37 and ignitrons IG4, IG5 and IG6 are interconnected together for control by valve V8 similarly as were valves V9, V11, V13, V15, V17, V19 and V36 and ignitrons IG1, IG2 and IG3 but are arranged to be operative during the opposite half cycles of the potential of lines L1, L2 and L3 to supply negative half cycles of energy to the electrodes E.

Normally during full cycle operation of the converter network it will be desirable to use a minimum of interpulse time to provide for a maximum of energy flow to the transformer WT during operation of the network 4 and normally the switch SW5 will be set in its No. 1 position. If, however, the load circuit of the transformer WT is so very highly inductive that the commutation between negative and positive half cycles of load current causes transient surges of too high a magnitude, it may be desirable to adjust switch SW5 for a longer interpulse time.

It will be apparent that, within limits, the discharge rate of the capacitors C4 and C5 of the frequency determining network 14 may be set to discharge as slowly as desired to maintain a low alternation of conductivity between the valves V3 and V4. Within practical limits, however, it seems desirable to place a minimum discharge rate for these capacitors C4 and C5 such that the valve V9 will remain conducting for about five cycles of the voltage wave between the lines L1 and L2 so that the ignitron IG1 will be fired during five consecutive half cycles of voltage in which the line L1 is positive with respect to the line L2 under control of valve V9.

The valves V3 and V4 will continue to alternate to provide positive and negative half cycles of energy to the electrodes E until the valve V2 reconducts whereby a blocking potential will be applied by the resistor R2 to the valve V3 which is preferably timed by the resistor to occur at intervals in which valve V3 is nonconductive so that it will not reconduct in response to the timing out of the capacitor C5 which, prior thereto, permitted valve V3 to reconduct to initiate another cycle of energy flow to the electrodes E. At the end of the period in which valve V4 would normally be extinguished by the reconduction of valve V3, valve V4 continues to conduct but is rendered ineffective to continue to block valve V6 due to the charged condition of capacitor C10. Valve V8 therefore becomes blocked exactly as if valve V3 had reconducted and the ignitron IG6 will fire IG4 as a commutating valve and the current flow to the transformer WT will stop.

The valve V4 supplies a blocking bias potential to the valve V6 as a consequence of a flow of charging current to the capacitor C10 through the resistance R23 and resistor sections SW3c, SW4c and SW5c. The values of the resistance inserted by the sections SW3c, SW4c and SW5c are so adjusted and maintained adjusted, as will be pointed out hereinafter, so that the charging time of the capacitor C10 is correlated to the frequency of alternation of the conduction of valves V3 and V4. The timing is such that the capacitor C10 becomes sufficiently charged at the end of the normal conducting time of the valve V4 to reduce the charging current supplied thereto so that the potential drop across the resistor R23 and sections SW3c, SW4c and SW5c is no longer sufficient to establish a blocking potential on valve V6. Valve V6 therefore becomes conductive even through the alternating operation of these valves V3 and V4 has been terminated by reconduction of valve V2 to maintain valve V4 continually conductive. With this arrangement with a time rate of charging of the capacitor C10, the period in which valve V6 is held nonconductive can never exceed the desired length of time even though valve V4 continues to conduct. During the alternating operation of the valves V3 and V4 the charging time of capacitor C10 is sufficient to maintain the valve V6 blocked for the conducting time period of valve V4. To assure a quick discharge of the capacitor C10 so that it will be charged each operation at the same time-rate ratio a valve V25 is provided in shunt with the charging circuit for the capacitor C10 and is polarized to prevent flow of charging current to the capacitor C10 but to permit a rapid discharge of capacitor C10 through a portion of the resistor R11.

The taps on the tapped resistor sections SW3a, SW4a and SW5a are so chosen that the time difference afforded by each step is approximately the time period of one cycle of the potential of lines L1, L2 and L3 so that as shown the valves V3 and V4 may be adjusted to alternate to provide for varying load frequencies.

It will be observed that a low frequency output half cycle supplied to the electrodes E comprises an interpulse time and an energy supplying time which energy time will include a full power time period with or without a lesser power period. The interpulse time is controlled by the interpulse timing switch SW5, the pulse time (full power period) by the pulse timing switch SW3, and the tailing time (reduced power period) by the tailing timing switch SW4. During periods in which only half cycles are being supplied (positions Nos. 2, 3 and 4 of switch SW1) to the load circuit as contrasted with full cycles (position No. 1 of switch SW1), the interpulse switch SW5 is not effective to control timing functions and a timing controlling switch SW6 is utilized to time a similar interval but which during half cycle operation is termed a weld delay period since it controls the period between initiation of the network 4 to render valves V1 and V3 conductive (these valves work in sequence but substantially simultaneously) and the rendering of valve V5 or V7 conductive to initiate the indexing and firing networks 20 and 22. As explained above, there is inherently substantially a one cycle delay between initiation of conduction of the valve V3 and the rendering of valve V6 or V8 conductive but the interpulse switch SW5 or weld delay switch SW6 can increase this time period in one cycle steps.

In view of the relatively separate cycle portions which act together to constitute a half or full cycle of load energy it is necessary to provide for changing the time periods of the various cycle portions in an interrelated manner. All of the timing functions are measured from one base point which is the time at which the conductivity of valves $V_3$ or $V_4$ is changed. For example, if it is desired to increase the interpulse time the switch SW5 is adjusted to add the desired number (for example 2) cycles of time measured as a function of the frequency of potential supplied to lines L1, L2 and L3. The switches SW3, SW4, SW5 and SW6 are arranged to add or subtract one cycle of time when they are advanced or returned one position. The pulse time is measured from the same base point as the interpulse time and, therefore, its timing must be increased one cycle. Similarly the tailing time must be increased one cycle. With the particular arrangement of tapped resistor sections of the switches SW3, SW4, SW5 and SW6 as shown and described, an operator may individually adjust the pulse time by switch SW3, the tailing time by switch SW4, the interpulse time by switch SW5, and the weld time by switch SW6 and because of the interrelated sections the required change in timing of the other timing functions will be made.

Switches SW7 and SW8 which respectively control the coarse and fine adjustments for controlling the magnitude of the energy supplied during pulse time have tapped resistor sections arranged in each phase of the supplied power. Preferably each tap of the sections SW7a, SW7b and SW7c of switch SW7 will effect a 10% change in the current supplied by the ignitrons. Preferably each tap of the sections SW8a, SW8b and SW8c of switch SW8 will effect a 1% change in the current supplied by the ignitron so that by a proper adjustment of switches SW7 and SW8 the current supplied may be controlled from 1% to 100% of the rated current output of the transformer WT.

The tailing current is always a percentage of the pulse current and switch SW9 is provided with tapped resistor sections SW9a, SW9b and SW9c located individually in the three phases of the power supply and may each be provided with ten sections to regulate the tailing current in steps of 10% of the pulse power.

Let us now look more specifically at the tailing current timing function of the network 26 and see how it effects the curent supplied to the electrodes E during each half cycle in which current is being supplied to the electrodes E. Upon conduction of the valve V3 a potential is established across the resistors R8, R9 and R10. This established potential places a potential across the conductors 352 and 354 to charge the capacitor C12. The charging current of capacitor C12 flows through the winding 350 of transformer T30 and induces a surge or pulse voltage in the winding 348 which renders the valve V26 conductive. Valve V26 conducts and extinguishes valve V27 to terminate current flow through the resistors R36, R37 and R38 permitting the valves V30—V35 to be rendered conductive by the transformers T26, T24 and T25. Conduction of valves V30—V35 reduce the impedance of the transformers T27, T28 and T29 so that the phase of the anode voltage supplied by network 24 to the network 20 is at the advanced angle as determined by the switches SW7 and SW8. At a predetermined later time as determined by the tailing time switch SW4 the capacitor C14 will have discharged sufficiently to permit valve V27 to reconduct under control of the network 362. Such reconduction re-establishes the potential across resistors R36, R37 and R38 to apply block-bias potentials to the valves V30—V35. As explained above, this results in an increase in impedance across the transformers T27, T28 and T29 to render the switches SW9 effective to increase the phase angle of the voltage supplied by network 24 to network 20 to reduce the power supplied by the ignitrons IG1, IG2 and IG3 to the electrodes E to a percentage of the full power supplied as determined by the switches SW7 and SW8. During the negative half cycle of load power the conducting of the valve V4 results in the charging of capacitor C13 and the rendering of valve V26 conducting whereby the same effect is produced as just described. In this case, however, the time of the rendering of the valve V26 conductive is during the opposite half cycle of the voltage between lines L1 and L2 and valve V27 reconducts under control of the network 362 also during the opposite half cycle of the line L1-line L2 voltage wave so that the power supplied to the electrodes E by the ignitrons IG4, IG5 and IG6 is reduced in the same manner as described with respect to ignitrons IG1, IG2 and IG3.

If no tailing time is desired the switch SW4 may be set in its No. 1 position to energize relay CR6 to open its contacts CR7a to render valve V27 ineffective to energize the resistors R36, R37 and R38 whereby valves V30—V35 continually conduct and to close its contacts CR7b, CR7c and CH7d to short out the switch sections of switch SW9. The same results could be accomplished by setting the switch SW9 at its No. 1 position which will render the transformers T27, T28 and T29 ineffective to phase shift the output voltage of the network 24.

In the foregoing discussion no consideration has been given to the operational results of the forge time network 8 except to mention that contacts CR16a of the sequence network 6 were closed as a consequence of the rendering of valve V56 conductive. These contacts are connected between conductors 606 and 608 and upon closure completes a circuit from the line L5 through contacts CR16c, line 608, winding 610 of relay CR25, and conductor 612 to the line L4. The completion of this circuit energizes the relay CR25 causing it to close its contacts CR25a and CR25b and to open its contacts CR25c. Opening of contacts CR25c opens the discharge circuit of the capacitor C100. Closure of the contacts CR25a and CR25b complete respectively the anode circuits for the valves V60 and V61.

Valve V60 is normally held nonconductive by means of the blocking bias potential placed between its control grid and cathode by a circuit which extends from the control grid through conductor 614, resistor R101, resistor R102, bus B24, resistor R103, potentiometer resistor R104, conductor 616 and bus B22 to the cathode of valve V60. Resistors R103, R104 and a resistor R105 are connected in series between the buses B24 and B23 in the order named and the drop across resistor R103 and a portion of R104 supplies the negative or blocking bias to valve V60. Valve V61 is held nonconducting by a negative blocking bias voltage established across a resistor R106 by the rectifying network 618 energized from the lines L4 and L5. The controlling circuit for the valve V61 extends from its controlling grid through resistor R106, conductor 620, winding 622, of transformer T30, and conductor 624 to the cathode of valve V61.

When a pulse of voltage is supplied to T30 at the time of initiation of conduction of the valve V3 an unblocking bias voltage pulse which overrides the blocking bias established across resistor R106 is applied to the valve V61 which renders valve V61 conducting. Valve V61 is supplied with direct current potential and continues to conduct even though the conducting pulse disappears. Conduction of valve V61 causes charging current to flow from bus B23 through the now closed contacts CR25b, valve V61, resistor R100, resistor R101, and capacitor C100 back to the bus B24. The rate of charging of the capacitor C100 is controlled by the switches SW25—SW29 which are arranged to shunt out of, or insert into, the charging circuit of capacitor C100 various portions of the resistor R100 to control the rate of charging of capacitor C100. The switches SW25—SW29 may be arranged to control the charging rate in steps of one cycle or an integral number of cycles as measured by the potential between lines L1 and L2. Depending upon the setting of the switches SW25—SW29, the capacitor C100 will become charged sufficiently so that the potential thereacross overcomes the potential of resistor R103 and the left hand portion of resistor R104 so that the valve V60 becomes conductive.

Conduction of valve V60 energizes the solenoid winding 604 which is operatively connected to a control valve (not shown but which is equivalent to the control valve 118 of said Clark Patent No. 2,331,537) whereby forging pressure is applied to the electrodes E.

Let us now operate the converter so that only a single half cycle of low frequency current will be transmitted to the welding electrodes E as a consequence of any one closure of the initiation switch SW20 (FIGURE 2). The switch SW1 is now moved from its No. 1 position to its No. 2 position which generically renders the network 10 ineffective to time the weld interval and transfers the weld interval timing function to the network 14. Specifically movement of switch SW1 from its No. 1 to its No. 2 position causes switch sections SW1a and SW1b to connect the relays CR1, CR3 and CR4 for controlling the stepping or indexing relay CR2, switch section SW1c to connect the relay CR2 for control by the relay CR16 and relay CR8 and open the circuit of the erlay CR6, section SW1d to shunt out the weld timing resistor R5 so that capacitor C2 will rapidly discharge upon conduction of the valve V1 to permit a rapid subsequent reconduction of the valve V2 and blocking of the valve V1 to remove the conducting bias potential applied by this valve to the valve V3, section SW1e to render the capacitor C5 ineffective to control the valve V3, section SW1f to transfer the timing control of capacitor C10 from switch section SW5b of the interpulse switch SW5 to section SW6a of the weld delay switch SW6, section SW1g and SW1h to connect the connect the controlling grids of valve V5 and V7 to the conductor through contacts CR3a of relay CR3 and CR4a of relay CR4 whereby the networks 16 and 18 are alternately effective, under control of relay CR2, sections SW1j and SW1k, to transfer the discharge circuit for timing capacitors C7 and C7a from the interpulse switch SW5 to the weld delay switch SW6, and section SW1m to transfer the discharge circuit for the timing capacitor C14 from the interpulse switch SW5 to the weld delay switch SW6.

Upon de-energization of the relay CR7, its contacts CR7a and CR7c open and its contacts CR7b and CR7d close. Opening of the contacts CR7a and closure of the contacts CR7b transfer the function of energizing the conductor 38 and 40 at the end of a weld period from the transformer T3 of network 10 to the transformer T30 which is energized by the network 14. Closure of contacts CR7d and opening of contacts CR7c render the valve V4 of network 14 ineffective to act through transformer T31 to actuate the tailing network 26.

The shunting of resistor R5 of network 19 does not interfere with the triggering of the valve V3 to render this valve conductive as a consequence of the conduction of valve V1 and the blocking of valve V2. It does, however, permit a rapid reconduction of valve V2 to re-establish the blocking bias potential between the shield grid and cathode of the valve V3 so that as soon as the valve V4 reconducts to blow out the valve V3 the valve V3 will not again become conductive.

Insomuch as the action of the tailing circuit is the same whether the converter network is being operated on full cycle or half cycle operation the remainder of the description of operation will be simplified by assuming that the switch SW4 has been set to its initial position in which the tapped resistor sections SW4a, SW4b and SW4c exert no timing function and the switch section SW4d is set to energize the relay CR6 to disconnect the cathode of the valve V27 from the conductor 346 to render the tailing network 26 ineffective and to short out the tapped resistor sections SW9a, SW9b and SW9c of the switch SW9 to insure full energy flow to the welding transformer WT under control of the phase shift controlled by the switches SW7 and SW8.

Closure of the switch SW20 of the sequencing network 6 acts in the manner above described to apply a conducting bias potential between the conductors 38 and 40 to render the valve V1 conducting. Rendering of the valve V1 conductive causes the valve V2 to become extinguished as above described thereby removing the blocking bias potential placed between the screen grid and cathode of the valve V3 by the resistor R2. The discharging time of the capacitor C2 through the resistance R6 (the resistor R5 having now been shorted out) is sufficient to insure a time interval long enough for the valve V3 to become conducting, but short enough so that valve V2 will become conducting shortly after valve V3 conducts. Valve V2 remains conducting throughout the remainder of the operating sequence.

Let us now assume that the contacts CR2a are closed and the relays CR1 and CR3 are energized. Relay CR1 maintains the same relative polarities of transformer T4 as in the full cycle operation. Relay CR3 through its now closed contacts CR3a connects the controlling grid of the valve V5 to the conductor 112 so that when the valve V3 is rendered conducting the potential appearing across the resistor R9 in its anode circuit will be applied btween the controlling grid and cathode of the valve V5 which then blocks to initiate the discharge of the capacitor C7. The capacitor C7 now discharges as discussed in connection with full cycle operation except that resistor section SW6c of the weld relay section SW6 has been substituted for section SW5d of the interpulse switch SW5. At the end of the weld delay time, valve V9 will be rendered conductive to render valves V11, V13, V15, V17 and V19 and ignitrons IG1, IG2 and IG3 conductive as described above in connection with full cycle operation. The difference being that upon reconduction of valve V4 and blocking of valve V3, the energy flow to the transformer WT is terminated. The tailing network as well as forge delay, if effective, would act in the same manner as described above. The now open contacts CR4a of the relay CR4 prevents a blocking bias potential from being applied between the control grid and cathode of the valve V6 as a consequence of the conduction of valve V3 and valve V8 will continue to remain blocked under the control of the now charged capacitor C7a to prevent firing of the ignitrons IG4, IG5 and IG6.

Rendering of the valve V3 conducting causes the valve V4 to become nonconducting for a predetermined time interval as determined by the discharging time of the capacitor C4 which now discharges through the tapped resistor section SW6a, the tapped resistor sections SW3b and SW4b and resistor R15. This discharge circuit for the capacitor C4 times the length of the positive half cycle of current supplied to the welding electrodes E. Upon reconduction of the valve V4 a pulse will be applied across the primary winding 358 of the transformer T31 which will cause the secondary winding 158 thereof to impress a control pulse between the conductors 38 and 40 for initiating operation of the sequencing network 6 to time out hold time and off time as described above in connection with full cycle operation. Due to the now open condition of contacts CR7c the pulse supplied to transformer T31 is not effective to actuate valve V26. Reconduction of the valve V4 also extinguishes the valve V3 which removes the blocking bias potential from the valve to conduct and charge capacitor C7 to restore the blocking bias potential to the valve V7.

Upon de-energization of the relay CR16 of the network 6 and consequent closure of the contacts CR16a, the relay CR2 will be energized to step its contacts whereby contacts CR2a open and contacts CR2b close for de-energizing the control relays CR1 and CR3 and energizing the control relay CR4. The de-energization of relay CR3 and energization of relay CR4 disconnects the connection of control grid of valve V5 from the conductor 112 and connects the control grid of the valve V6 to the conductor 112 so that upon subsequent reclosure of start switch SW20 conduction of the valve V3, as described above in connection with a positive half cycle pulse, will block valve V6 to permit the valve V8 to conduct and cause conduction of the valves V10, V12, V14, V16, V18 and V20 to fire the ignitrons IG4, IG5 and IG6 as was described above in connection with the blocking of the valve V5 and consequent firing of the ignitrons IG1, IG2 and IG3. It can, therefore, be seen that upon successive closure of the switch SW20 to initiate successive energization of the electrodes E they will be supplied with half cycle of energy pulses alternating in polarity. Relay CR3 is provided so that if the weld no-weld switch SW11 is opened and the networks are operated without energizing the ignitrons, the winding 140 of relay CR2 will remain continually energized irrespective of the opening and closing of the contacts CR16a of relay CR16 so that the next time the networks are operated to supply welding energy, it will be supplied to the transformer WT in the opposite direction to the last supplied pulse.

If the switch SW1 is changed to its No. 3 position to cause only positive pulses to be supplied to the electrodes E, the switch section SW1a will maintain the relays CR1 and CR3 continually energized to maintain the control grid of the valve V5 continually connected to the conductor 112. Switch section SW1b open the circuit to the relay CR4 preventing its energization. Switch section SW1c opens the circuit to the relay CR2 preventing its energization. Switch sections SW1d, Sw1e, Sw1f, SW1j, SW1k and SW1m, while being moved, effect no change in the circuits therethrough as will be evident from the drawings. Section SW1g connects the controlling grid of valve V5 directly to conductor 112. Section SW1h opens the circuit to the controlling grid of valve V6. With this arrangement it will be apparent that energy pulses of the same polarity will be applied by the welding transformer WT to the welding electrodes E as a consequence of each closure of the switch SW20. These will be supplied substantially as described in connection with the positive energy pulse described above for alternate polarities operation.

If it is desired to supply a series of negative pulses of the switch SW1 is moved to its No. 4 position. In this position of the switch SW1, section SW1a opens the circuit to the relays CR1 and CR3 whereby they are deenergized. Section SW1b maintains the relay CR4 energized. Section SW1c opens the circuit to relay CR2 preventing its energization. Sections SW1d, SW1e, SW1f, SW1j, Sw1k and SW1m act to complete the same circuits as they did with switch SW1 in its No. 2 or No. 3 positions. Section SW1g opens the circuit of the controlling grid of valve V5 and section SW1h connects the controlling grid of the valve V6 to the conductor 112. In other respects the operation of the system with a switch SW1 set in its No. 4 position is like the above described operation with switch SW1 set in its No. 3 position except that network 18 is utilized to control valves V10, V12, V14, V16, V18 and V20 and ignitrons IG4, IG5 and IG6.

The foregoing description of the operation of the network 6 has been given in which the initiation of the network 4 was a consequence of the timing out of the squeeze time network 504. If desired micro-switch control of the network 4 may be used. In this event the switch SW22 is turned to its other position and a switch actuated by the pressure exerted by the electrodes, as for example the switch 212 of the said Clark Patent No. 2,331,537 or equivalent, substituted for the fluid pressure switch SW21. Under these conditions closure of switch SW2 initiates the operation of the relay CR16 in the manner already explained to move the electrodes E against the work W. When the electrodes E are engaging the work W at a desired pressure the switch substituted for switch SW21 closes and connects the controlling grid of valve V50 to its cathode through switch SW20 and/or contacts CR15a and valve V50 conducts with the same consequence as when it conducted in response to the timing out of the network 504. In other respects the operation is the same as described above.

In the operation of welding machines it is often desirable to cause the electrodes to be clamped together for the purpose of tip dressing. To accomplish this, a relay CR26 is provided in which the energizing winding 626 thereof is connected through a switch SW30 between the lines L4 and L5. Closure of this switch SW30 energizes the relay CR26 to close its contacts CR26a and CR26b. Closure of contacts CR26a and CR26b establishes an energizing circuit for solenoid winding 604 in shunt with contacts CR25a and valve V60 to cause the winding to become energized to actuate the ram, as for example, by energizing the solenoid 118 of said Clark patent to dump the fluid from below the Clark piston 68.

It will be noted that neon type glow lamps G1, G2, G3, G4, G5 and G6 are connected between the anode and igniter in series with the igniter fuse of each of the ignitrons IG1, IG2, IG3, IG4, IG5 and IG6. Under normal operation these lamps will continue to flash as the ignitrons with which they are associated are fired. If, however, a fuse blows they will fail to light. If a firing tube fails to conduct they will stay lighted for longer periods of time than otherwise. The foregoing illustrations of the operation of the lamps are not intended to be complete. Lamps G1—G6 therefore are indicator lamps to advise the operation of the working condition of the ignitrons and network 22.

While I have shown a preferred embodiment of the invention in compliance with the patent statutes, it is intended to be illustrative and not limitative since it will become aparent to those skilled in the art that many changes and alterations may be made thereto and still be within the scope of the invention. The scope of the invention is, therefore, to be determined by the scope of the hereinafter appended claims.

What is claimed and is desired to be secured by United States Letters Patent is as follows:

1. In a timing apparatus, a first timing device for timing out a desired time interval subsequent to initiation of said device, said timing interval of said device being of a first magnitude, a second timing device for timing out a second desired time interval subsequent to initiation of said second device, means for reinitiating said second device for timing out a subsequent one of its said timing intervals subsequent to the timing out of a preceding one of its said intervals, said timing interval of said second device being of lesser magnitude than said interval of said first device, and means interconnecting said timing devices whereby said second device is rendered effective to initiate its said timing functions solely during said time interval of said first timing device.

2. The combination of claim 1 in which there is provided a control device for determining the length of said timing interval of said first timing device, said control device having a first and a second operating position, said control device being effective when in said first position to maintain said interval of said first timing device greater than said interval of said second timing device, said control device being effective when in said second position to reduce said interval of said first timing device to an interval which is less than said interval of said second timing device.

3. In a timing apparatus, a first timing device for timing out a desired time interval subsequent to initiation of said device, said timing interval of said device being of a first magnitude, a sceond timing device having a pair of timing elements for sequentially timing out a pair of second desired time intervals subsequent to initiation of said second device, means responsive to the last-to-time-out of said pair of timing elements for reinitiating the timing out of the first-to-time-out of said pair of timing elements to provide for a chain-like group of said second time intervals, said timing intervals of said second device being of lesser magnitude than said interval of said first device, and means interconnecting said timing devices whereby said second device is rendered effective to initiate its said timing functions solely during said time interval of said first timing device.

4. The combination of claim 3 in which there is provided a control device for determining the length of said timing interval of said first timing device, said control device having a first and a second operating position, said control device being effective when in said first position to maintain said interval of said first timing device greater than the sum of any two of said intervals of said second timing device, said control device being effective when in said second position to reduce said interval of said first timing device to an interval which is less than one of said intervals of said second timing device.

5. The combination of claim 4 in which said control device is effective when in its said second position to reduce said interval of the other of said timing elements of said second timing device.

6. In a timing apparatus, a first timing device for timing out a desired time interval subsequent to initiation of said device, said timing interval of said device being of a first magnitude, a second timing device for timing out a plurality of sequentially occurring second desired time intervals subsequent to initiation of said second device, said timing interval of said second device being of lesser magnitude than said interval of said first device, means interconnecting said timing devices whereby said second device is rendered effective to initiate its said timing functions solely during said time interval of said first timing device, a pair of controlled networks for controlling a pair of controlled devices, said second timing device having a pair of output circuits individually energized by said second timing device during subsequent ones of said second intervals, means including a switching means for connecting said pair of controlled networks to said pair of circuits, said switching means having a first and a second state and effective when in said first state to connect a first of said controlled networks to a first of said output circuits and the second of said controlled networks to the second of said output circuits, said switching means being effective when in its said second state to connect said second network to said first output circuit, said switching means further being effective when in said first state to maintain said interval of said first timing device greater than said intervals of said second timing device, said switching means being effective when in said second state to reduce said interval of said first timing device to an interval which is less than said intervals of said second timing device.

7. The combination of claim 6 in which said first timing device includes a pair of sequentially actuated timing portions, a first of said portions acting to time one of said output circuits and a second of said portions acting in response to the timing out of said first portion to time the other of said output circuits, said switching means being effective in its said second state to reduce the time interval of said second timing portion.

8. The combination of claim 7 in which said switching means is operable in its said second state to reduce said time interval of said first timing device to a lesser interval than that of said first timing portion.

9. In a timing apparatus, a pair of controlled networks for controlling a pair of controlled devices, a timing network having a pair of output circuits and including a timing device for alternately controlling the energization of said circuits, means including a first switching device for interconnecting said pair of controlled networks to said pair of circuits, said switching device having a first position in which a first of said controlled networks is connected to a first of said circuits and the second of said controlled networks is connected to the second of said circuits, said switching device having a second position in which said second network is connected to said first circuit.

10. The combination of claim 9 in which said means includes a second switching device rendered effective solely when said first switching device is in its said second position, means actuatable in timed sequence with the change in energization of one of said circuits for actuating said second switching device between two controlling positions, said second switching device being operable in one of its said positions to render said first switching device effective in its said second position to connect said second network to said first circuit, said second switching device when in its said one position being operable to render said first switching device effective to disconnect said first network from said first circuit, said second switching device being operable in the other of its said positions to render said first switching device effective to connect said first network to said first circuit and to render said first switching device ineffective to connect said second network to said first circuit.

11. The combination of claim 10 in which said timing network is provided with a pair of timing devices connected for endless chain operation, one of said timing devices being effective to control the change in energization of one of said circuits and the other of said timing devices being effective to control the change in energization of the other of said circuits, said first switching device being effective when in its said second position to change the time interval of operation of one of said pair of timing devices.

12. The combination of claim 11 in which said one of said pair of timing devices controls said second circuit and said first switching device acts to reduce the said interval of operation of said one timing device.

13. The combination of claim 9 in which said timing network is provided with a pair of timing devices connected for endless chain operation, one of said timing devices being effective to control the change in energization of one of said circuits and the other of said timing devices being effective to control the change in energization of the other of said circuits, said first switching device being effective when in its said second position to change the time interval of operation of one of said pair of timing devices.

14. In an electrical system of the character described, a first asymmetric current conducting device arranged to conduct current in a first direction, a second asymmetric current conducting device arranged to conduct current in a second direction, a first control device operatively connected with said first asymmetric device for controlling conduction of current therethrough, a second control device operatively connected with said second asymmetric device for controlling conduction of current therethrough, a controlling network having a sequence of operation and including an initiating device for initiating an operation thereof, a switching device operable in response to successive operations of said controlling network for alternately rendering said first and said second control device effective to permit conduction of current through its respective said asymmetric device, and selectively operable control means for preventing conduction of said asymmetric devices as a consequence of an operation of said controlling network and including means for rendering said controlling network ineffective to actuate said switching device so that irrespective of the number of said operations of said controlling network which may be made when said selectively operable control means is effective, the next said operation of said controlling network subsequent to the rendering ineffective of said selectively operable control means will be effective to permit current flow through the opposite one of said asymmetric devices from the one of said asymmetric devices which was last rendered conducting.

15. In an electrical system of the character described, a first electric valve arranged to conduct current in a first direction, a second electric valve arranged to conduct current in a second direction, each said valve having a pair of principal electrodes and a control electrode, a first control circuit connected between one of said principal electrodes and said control electrode of said first valve for controlling conduction of current therethrough, a second control circuit connected between one of said principal electrodes and said control electrode of said second valve for controlling conduction of current therethrough, a controlling network controlling at least two related operational sequences and including an initiating device for initiating said sequences, one of said related sequences being to control the time period of energization of a timing electric circuit, a switching device interconnecting said timing circuit to said control circuits and operable in response to successive operations of said controlling network for alternately rendering said first and said second control circuit effective to be controlled by said timing circuit, and selectively operable control means for preventing conduction of said valves as a consequence of an operation of said timing circuit and including means for rendering said controlling network ineffective to actuate said switching device so that, irrespective of the number of said operations of said controlling network which may be made when said selectively operable control means is effective, the next said operation of said controlling network subsequent to the rendering ineffective of said selectively operable control means will be effective to permit current flow through the opposite one of said valves from the one of said valves which was last rendered conducting.

16. In a network for transferring power from a source of alternating potential to a load circuit, a frequency timing network, a pair of interpulse timing networks, a firing network, said frequency network including a pair of output circuits and a timing device for controlling said circuits between a first and a second condition and in a manner such that when one of said circuits is rendered into its first condition the other of said circuits will be rendered into its second condition, means individually connecting said interpulse networks to said output circuits whereby said interpulse networks are actuated to perform their timing function as a consequence of the rendering into its said first condition of the respective said output circuit to which it is connected, said firing network including a pair of discontinuous control type electric valve means, circuit means interconnecting each of said interpulse networks with said firing network whereby one of said pair of valve means is rendered conductive as a consequence of the completion of said timing function of one of said interpulse networks and the other of said pair of valve means is rendered conductive as a consequence of the completion of said timing function of the other of said interpulse networks, means for synchronizing said frequency timing network with respect to the conducting periods of said valve means so that the condition of said output circuits are changed during a time interval in which one of said valve means is conducting.

17. In a network for transferring power from a polyphase source of alternating potential to a load circuit, a frequency timing network, a pair of interpulse timing networks, a sequencing network, said frequency network including a pair of output circuits and a timing device for controlling said circuits between a first and a second condition and in a manner such that when one of said circuits is rendered into its first condition the other of said circuits will be rendered into its second condition, means individually connecting said interpulse networks to said output circuits whereby said interpulse networks are actuated to perform their timing functions as a consequence of the rendering into its said first condition of the respective said output circuit to which it is connected, said sequencing network including a plurality of pairs of discontinuous control type electric valves, the valves of each of said pairs being connected in back-to-back relation and said pairs being individually connected between the phases of said source and said load circuit, a pair of circuit means individually interconnecting each of said interpulse networks with said sequencing network, a first of said pair of circuit means being operable upon actuation to render conductive one of said valves of a first of said pairs of valves as a consequence of the completion of said timing function of one of said interpulse networks and the second of said pair of circuit means being operable upon actuation to render conductive the other valve of said first pair of valves as a consequence of the completion of said timing function of the other of said interpulse networks, means for sequentially rendering conductive a first valve of each of the remainder of said pairs of valves in response to a single actuation of said first circuit means, means for sequentially rendering conductive the second valve of each of said remainder pairs of valves in response to a single actuation of said second circuit means, means for synchronizing said frequency timing network with respect to the conducting periods of said valve means so that the condition of said output circuits are changed during a time interval in which one of said valves of said remainder pairs of valves is conducting.

18. In a network for transferring power from a polyphase source of alternating potential to a load circuit, a free running multivibrator frequency timing network including a pair of alternately conducting thyratrons, a pair of interpulse timing networks, a sequencing network, said frequency network including a pair of output circuits individually associated with said thyratrons and energized and deenergized as a consequence of the conduction and nonconduction of the respective said thyratron with which it is associated, means individually connecting said interpulse networks to said output circuits whereby said interpulse networks are actuated to perform their timing function as a consequence of the conduction of the respective said thyratron with which said output circuit is associated, said sequencing network including a plurality of pairs of discontinuous control type electric valves, the valves of each of said pairs being connected in back-to-back relation and said pairs being individually connected between the phases of said source and said load circuit, a pair of circuit means individually interconnecting each of said interpulse networks with said sequencing network, a first of said pair of circuit means being operable upon actuation to render conductive one of said valves of a first of said pairs of valves as a consequence of the completion of said timing function of one of said interpulse networks and the second of said pair of circuit means being operable upon actuation to render conductive the other valve of said first pair of valves as a consequence of the completion of said timing function of the other of said interpulse networks, means for sequentially rendering conductive a first valve of each of the remainder of said pairs of valves in response to a single energization of said first circuit means, means for sequentially rendering conductive the second valve of each of said remainder pairs of valves in response to a single energization of said second circuit means, means including a transformer energizable from a source of voltage having a frequency which is a multiple of the frequency of said polyphase source for synchronizing said frequency timing network with respect to the conducting periods of said valve means so that the conduction of said thyratrons are changed during a time interval in which one of said valves of said remainder pairs of valves is conducting.

19. In a converter for controlling the flow of alternating energy from a polyphase source to a load, a plurality of pairs of back-to-back connected discharge devices, said pairs of said devices being individually connected between each of the phases of such source and such load, a first device of each of said pairs of devices being arranged to conduct current in a first direction between such source and such load, a second device of each of said pairs of devices being arranged to conduct current in a second direction between such source and such load, each said device being provided with means for controlling the instants at which it becomes conductive, a firing network having a first controlling circuit connected to said controlling means of each of said first devices and operable upon actuation from a first to a second operating condition to render each of said first devices conductive in sequence, said firing network having a second controlling circuit connected to said controlling means of each of said second devices and operable upon actuation from a first to a second operating condition to render each of said second devices conductive in sequence, an inverter network having a controlling circuit connected to be actuated in timed relation with the conduction of the last-to-be-rendered-conductive of said first devices and operatively connected to render conductive one of said first devices which is in back-to-back relation with the first-to-be-rendered-conductive said second device and at a time period which is late in the half cycle of the voltage wave in which said just-mentioned device is capable of conducting, and means for actuating said circuits of said firing network from said first to said second conditions.

20. The combination of claim 19 in which said last named means comprises a timer for alternately actuating said circuits at a desired frequency and in a manner such that when one of said circuits is actuated to said first condition the other of said circuits is actuated to its said second condition.

21. The combination of claim 19 in which each of said circuits includes an interpulse timer, each said interpulse timer acting upon actuation of its respective said circuit to provide a time delay interval between the actuation of its respective said circuit and the rendering of said circuit from its said first to its said second condition, said timer acting upon deactivation of its respective said circuit to return said circuit to its said first condition in lesser time than said time delay interval.

22. In a converter for controlling the flow of alternating energy from a polyphase source to a load, a plurality of pairs of back-to-back connected discharge devices, said pairs of said devices being individually connected between each of the phases of such source and such load, a first device of each of said pairs of devices being arranged to conduct current in a first direction between such source and such load, a second device of each of said pairs of devices being arranged to conduct current in a second direction between such source and such load, each said device being provided with means for controlling the instants at which it becomes conductive, a firing network having a first controlling circuit connected to said controlling means of one of said first devices and operable upon actuation from a first to a second operating condition to render said one first device conductive, means responsive to said second operating condition of said first controlling circuit for sequentially rendering each of the remainder of said first devices conductive in sequence, said firing network having a second controlling circuit connected to said controlling means of one of said second devices and operable upon actuation from a first to a second operating condition to render said one second device conductive, means responsive to said second controlling circuit for esquentially rendering each of the remainder of said second devices conductive in sequence, a first inverter network having a controlling circuit connected to be actuated in timed relation with the conduction of the last-to-be-rendered-conductive of said first devices and operatively connected to render conductive said one first device at a time period which is late in the half cycle of the voltage wave in which said one first device is capable of conducting, and a second inverter network having a controlling circuit connected to be actuated in timed relation with the conduction of the last-to-be-rendered-conductive of said second devices and operatively connected to render conductive said one second device at a time period which is late in the half cycle of the voltage wave in which said one second device is capable of conducting.

23. The combination of claim 22 in which said first and said second controlling circuits comprise a plurality of electric valves, said valves of said first controlling circuit being individually connected to said first discharge devices, said valve of said second controlling circuit being individually connected to said second devices, said means for sequentially rendering said remainder one discharge devices conductive including those of said valve of said first controlling circuit which are associated with said remainder first devices, said means for sequentially rendering said remainder second discharge devices conductive including those of said valves of said second controlling circuit which are associated with said remainder second devices, said first inverter network being connected to be actuated by said valve of said first controlling circuit which is associated with said last-to-be-rendered-conductive one of said first devices, said second inverter network being connected to be actuated by said valve of said second controlling circuit which is associated with said last-to-be-rendered-conductive one of said second devices.

24. The combination of claim 23 in which each said inverter circuit includes a valve having a pair of main electrodes and a control electrode and in which two of said electrodes are energized from a phase of said source which is electrically spaced from the phase of said source to which said one devices are connected.

25. The combination of claim 22 in which each said inverter circuit includes a valve having a pair of main electrodes and a control electrode and in which two of said electrodes are energized from a phase of said source which is electrically spaced from the phase of said source to which said one devices are connected.

26. In a timing system, a pair of thyratrons each having an anode and a cathode and a control means the potential whereof with respect to said cathode determines the conductive condition of said thyratrons, a first source of direct potential having a negative bus and a positive bus, a pair of impedance elements each having a first and a second terminal, said first terminal of one of said impedance elements being connected to said anode of one of said thyratrons, said first terminal of the other of said impedance elements being connected to said anode of the other of said thyratrons, a first conductor connecting said second terminals of said impedance elements together and to said positive bus, an energy storage component connected between said control means of said other thyratron and said anode of said one thyratron, a discharge component connected to discharge said storage component, impedance means connected between said negative and positive busses, a second conductor connecting said cathodes together and to an intermediate portion of said impedance means, a transformer having an output winding connected between said control means of said other thyratrons and said negative bus, a bias potential control circuit connected between said control means of said one thyratron and said negative bus.

27. In a timing system for controlling the supply of energy from a polyphase source to a load; a single impulse and a free running multivibrator timing network; each said network including a pair of thyratrons each having an anode and a cathode and a control means the potential whereof with respect to said cathode determines the conductive condition of said thyratron, a first source of direct potential having a negative bus and a positive bus, a pair of impedance elements each having a first and a second terminal, said first terminal of one of said impedance elements being connected to said anode of one of said thyratrons, said first terminal of the other of said impedance elements being connected to said anode of the other of said thyratrons, a first conductor connecting said second terminals of said impedance elements together and to said positive bus, an energy storage component connected between said control means of said other thyratron and said anode of said one thyratron, a discharge component connected to discharge said storage component, impedance means connected between said negative and positive busses, a second conductor connecting said cathodes together and to an intermediate portion of said impedance means, a transformer having an output winding connected between said control means of said other thyratrons and said negative bus; a bias potential control circuit connected between said control means of said one thyratron and said negative bus of said single impulse timing network; a second transformer winding connected between said negative bus of said free running timing network and said positive bus of said single impulse timing network; a third conductor connected between said anode of said one thyratron of said single impulse network and said control means of said one thyratron of said free running timing network.

28. The combination of claim 27 in which there is provided a pair of interpulse timing networks; each said impulse network including a pair of thyratrons, each said thyratrons of said interpulse timing network having a cathode and an anode and a control electrode, a transformer winding having a pair of terminals, a fourth conductor connecting said anode of a second of its said valves through a primary winding of an output transformer to said cathode of the first of its said valves and to one of said winding terminals, a fifth conductor connecting said anode of its said first valve through an energy storage component to said cathode of its said second valve and to the other of said winding terminals, a discharge circuit for its said energy storage component including an impedance element, a second source of alternating potential connected between said cathode and said control electrode of its said second thyratron and phased to provide a control voltage which leads the voltage across said winding terminals by not less than 150 electrical degrees; a sixth conductor connecting said control electrode of said first valve of a first of said interpulse networks and to a point in the electrical path between said second terminal of said one impedance element and said first valve anode of said free running network; a seventh conductor connected to said cathode of said first valve of said first thyratron of said first interpulse network; an energy storage component connected intermediate said first terminal of said other impedance element and said anode of said other valve of said free running network; an eighth conductor connecting said control electrode of said first valve of the other of said interpulse networks to a point in the electrical path between said second terminal of said other impedance element and said storage component of said free running vibrator; and a ninth conductor connecting said cathode of said first valve of said other interpulse network to said cathode of said first valve of said one interpulse network.

29. The combination of claim 28 in which there is provided a pair of sequencing networks; each said sequencing network including a first thyratron and sufficient subsequent thyratrons to provide an individual thyratron for each of the phases of the source, each said thyratron having an anode and a cathode and a control electrode, a plurality of transformers equal in number to the number of phases of the source, each said transformer having a primary winding and a pair of secondary windings, said primary windings of said transformer being individually connected in series circuit with said anode and cathode of respective ones of said thyratrons, one of said secondary windings of said transformer which is associated with said first thyratron being connected between said control electrode and said cathode of the one of said thyratrons which is associated with the next subsequent phase of the source, the remainder of said one secondary windings of the remainder of said transformers except said transformer which is associated with the final phase of the source being individualy connected between said control electrode and said cathode of the respective said thyratron which is associated with the next subsequent phase of the source, a control circuit connected to each of the other of said secondary windings, an additional thyratron having an anode and a cathode and a control electrode, said one secondary winding of said transformer associated with the one of said subsequent thyratron which is energized from the last phase of the source being connected between said cathode and said control electrode of said additional thyratron, circuit means energized from the phase of the source following the phase of the source which is connected to said first thyratron and connected across said anode and said cathode of said additional thyratron, said last named circuit means including a control device connected in the said control circuit which is connected to said other secondary winding of said transformer associated with said first valve; circuit means, energized from said transformer which is associated with said second thyratron of said first interpulse network, connected between said control electrode and said cathode of said first thyratron of one of said sequencing networks; and circuits means energized from said transformer, which is associated with said second thyratron of said other interpulse network, connected between said control electrode and said cathode of said first thyratron of the other of said sequencing networks.

30. The combination of claim 29 in which there is provided a phase shifting circuit having the same number of output phases at the number of the phases of the source; circuit means energized by said phase shifting output phases for supplying energy to the anode circuits of said first thyratron and said subsequent thyratrons of each of said sequencing networks.

31. The combination of claim 30 in which there is provided a heat control timing network; said just-named network comprising, a first and a second thyratron each having an anode and a cathode and a control electrode, a source of direct potential including a positive bus and a negative bus, an impedance element connected between said anode of a first of said thyratrons and said positive bus, an energy storage device connected between said anode of said first thyratron and said control electrode of the second of said thyratrons, a discharge circuit for said energy storage device, an impedance means connected between said busses, said cathodes of said thyratrons being connected to an intermediate portion of said impedance means, a transformer having a primary winding and a secondary winding, circuit means including a capacitor connecting said primary winding across at least a portion of said one impedance element of said free running network, circuit means connecting said secondary winding of said just-mentioned transformer between said control electrode and said cathode of said first thyratrons of said heat timing network; said phase shifting network including means for controlling the magnitude of the phase shift of its output voltage with respect to that of the voltage supplied thereto; and circuit means including said cathode and said anode of said second thyratron of said heat timing network for controlling said control means of said phase shifting network.

32. The combination of claim 31 in which there is provided a load supplying network; said load supplying network comprising, a transformer having a single core and a plurality of primary windings and a single secondary winding, said primary windings being equal in number to the phases of the source and each having two terminals, a plurality of pairs of back-to-back connected ignitrons equal in number to the number of said primary windings, said pairs of ignitrons being individually connected between the phases of the source and one of the terminals of each of said primary windings, each said ignitron having an anode and a cathode and a control electrode, a firing circuit for each of said ignitrons including a firing thyratron, each said firing thyratron having an anode and a cathode and a control electrode, means individually connecting said anode and said cathode of said firing thyratrons between said control electrode and said cathode of said ignitrons, a first ignitron of each of said pairs of ignitrons being connected to conduct current between the source and its respective said primary winding in a direction to build up flux in said core in a first direction, a second ignitron of each of said pairs of ignitrons being connected to conduct current between the source and its respective said primary winding in a direction to build up flux in said core in a second direction opposite to said first direction; circuit means individually connecting said output circuits of said one sequencing network between said cathode and said control electrode of said firing ignitrons associated with said first ignitrons; and circuit means individually connecting said output circuits of said other sequencing network between said cathode and said control electrode of said firing thyratrons associated with said second ignitrons.

33. A frequency converting apparatus comprising, a plurality of timing networks, each said network including a pair of electric valves and timing means for changing the conductive conditions of one of said valves at the end of a predetermined time after a change in conductivity of the other of said valves, means for changing the conductivity of said other valve of a first of said networks to initiate an overall timing operation, a first controlling circuit connecting said overall timing network to a second of said networks and operable in response to a change in the conductive condition of said other valve of said overall timing network for initiating a timing operation of said second network, said second network being a half cycle timing network, said first circuit being responsive to a change in the conductive condition of said one valve of said overall timing network for terminating the timing operation of said half cycle timing network, said half cycle timing network including a second timing means for changing the conductive condition of its said other valve as a consequence of a change in the conductive condition of its said one valve whereby said valves of said half cycle timing network will be alternated between two current conducting conditions when said predetermined time of said overall timing network is longer than the time of said timing means of said half cycle network, a second controlling circuit connecting said half cycle network to a third of said networks and operable in response to a change in the conductive condition of a first of said valves to change the conductive condition of said other valve of said first valve to its original conductive condition to return said other valve of said third network to its original conductive condition, said third network being a positive interpulse timing network, a third controlling circuit connecting said half cycle timing network to a fourth of said networks and operable in response to a change in the conductive condition of the second of said valves of said half cycle timing network to change the conductive condition of said other valve of said fourth network and operable in response to the return of said second valve to its original conductive condition to return said other valve of said fourth network to its original conductive condition, said fourth network being a negative interpulse timing network, a load current controlling network including a plurality of pairs of back-to-back connected discharge devices, said pairs of said devices being individually connected between each of the phases of such source and such load, a first device of each of said pairs of devices being arranged to conduct current between such source and such load in a first direction, a second device of each of said pairs of devices being arranged to conduct current between such source and such load in a second direction, each said device being provided with means for controlling the instants at which it becomes conductive, an indexing network having a fourth controlling circuit connected to said controlling means of each of said first devices and operable upon actuation from a first to a second operating condition to render each of said second devices conductive in sequence, said indexing network having a fifth controlling circuit connected to said controlling means of each of said second devices and operable upon actuation from a first to a second operating condition to render each of said second devices conductive in sequence, a sixth controlling circuit connecting said positive interpulse timing network to said fourth circuit and operable in response to a change in the conductive condition of said one valve of said positive interpulse network to actuate said fourth circuit of said indexing network whereby said first devices are sequentially rendered conductive, said sixth circuit being operable in response to a return of said one valve of said positive interpulse network to its original conductive condition to terminate further sequences of operation of said first devices, a seventh controlling circuit connecting said negative interpulse timing network to said fifth circuit of said indexing network and operable in response to a change in the conductive condition of said one valve of said negative interpulse timing network to actuate said fifth circuit of said indexing network whereby said second devices are sequentially rendered conductive, said seventh circuit being operable in response to a return of said one valve of said negative interpulse timing network to its original conductive condition to terminate further sequences of operation of said second devices, an inverter network connected to be actuated in timer relation with the actuation of the last-to-be-rendered-conductive of said first devices and operatively connected to render conductive the said first device which is arranged in back-to-back relation with the first-to-be-rendered-conductive one of said second devices, means timing the operation of said inverter network whereby said just-mentioned back-to-back connected valve is rendered conductive late in the half cycle of the voltage wave during which it can conduct, a second inverter network connected between the last-to-be-rendered-conductive of said second devices and the said second device which is arranged in back-to-back relation with the first-to-be-rendered-conductive one of said first devices whereby said last-mentioned back-to-back connected valve is rendered conductive, means timing the operation of said second inverter network whereby said last-mentioned back-to-back connected valve is rendered conductive in the half cycle of the voltage wave during which it can conduct, and an eighth circuit interconnecting said half cycle timing network and a fifth of said timing networks and operable in response to a change in the conductive condition of a valve of said half cycle timing network for changing the conductive condition of a said valve of said fifth timing network, said fifth timing network being a power magnitude timing network, and means including a phase shifting apparatus interconnecting said power magnitude timing network and said indexing network and operable to determine the time at which said back-to-back devices are rendered conductive in the voltage waves of such source, said last named means being responsive to the conductive condition of a said valve of said power magnitude timing network for controlling the magnitude of the phase shift afforded by said phase by said phase shifting apparatus.

34. A frequency converting apparatus comprising, a plurality of timing networks, each said network including a pair of electric valves and timing means for changing the conductive conditions of one of said valves at the end of a predetermined time after a change in conductivity of the other of said valves, means for changing the conductivity of said other valve of a first of said networks to initiate an overall timing operation, a first controlling circuit connecting said overall timing network to a second of said networks and operable in response to a change in the conductive condition of said other valve of said overall timing network for initiating a timing operation of said second network, said second network being a half cycle timing network, said first circuit being responsive to a change in the conductive condition of said one valve of said overall timing network for terminating the timing operation of said half cycle timing network, said half cycle timing network including a second timing means for changing the conductive condition of its said other valve as a consequence of a change in the conductive condition of its said one valve whereby said valves of said half cycle timing network will be alternated between two current conducting conditions when said predetermined time of said overall timing network is longer than the time of said timing means of said half cycle network, a second controlling circuit connecting said half cycle network to a third of said networks and operable in response to a change in the conductive condition of a first of said valves to change the conductive condition of said other valve of said third network and operable in response to the return of said first valve to its original conductive condition to return said other valve of said third network to its original conductive condition, said third network being a positive interpulse timing network, a third controlling circuit connecting said half cycle timing network to a fourth of said networks and operable in response to a change in the conductive condition of the second of said valves of said half cycle timing network to change the conductive condition of said other valve of said fourth network and operable in response to the return of said second valve to its original conductive condition to return said other valve of said fourth network to its original conductive condition, said fourth network being a negative interpulse timing network, a load current controlling network including a plurality of pairs of back-to-back connected discharge devices, said pairs of said devices being individually connected between each of the phases of such source and such load, a first device of each of said pairs of devices being arranged to conduct current between such source and such load in a first direction, a second device of each of said pairs of devices being arranged to conduct current between such source and such load in a second direction, each said device being provided with means for controlling the instants at which it becomes conductive, an indexing network having a fourth controlling circuit connected to said controlling means of each of said first devices and operable upon actuation from a first to a second operating condition to render each of said second devices conductive in sequence, said indexing network having a fifth controlling circuit connected to said controlling means of each of said second devices and operable upon actuation from a first to a second operating condition to render each of said second devices conductive in sequence, a sixth controlling circuit connecting said positive interpulse timing network to said fourth circuit and operable in response to a change in the conductive condition of said one valve of said positive interpulse network to actuate said fourth circuit of said indexing network whereby said first devices are sequentially rendered conductive, said sixth circuit being operable in response to a return of said one valve of said positive interpulse network to its original conductive condition to terminate further sequences of operation of said first devices, a seventh controlling circuit connecting said negative interpulse timing network to said fifth circuit of said indexing network and operable in response to a change in the conductive condition of said one valve of said negative interpulse timing network to actuate said fifth circuit of said indexing network whereby said second devices are sequentially rendered conductive, said seventh circuit being operable in response to a return of said one valve of said negative interpulse timing network to its original conductive condition to terminate further sequences of operation of said second devices, an inverter network connected to be actuated in timed relation with the actuation of the last-to-be-rendered-conductive of said first devices and operatively connected to render conductive the said first device which is arranged in back-to-back relation with the first-to-be-rendered-conductive one of said second devices, means timing the operation of said inverter network whereby said just-mentioned back-to-back connected valve is rendered conductive late in the half cycle of the voltage wave during which it can conduct, a second inverter network connected betwen the last-to-be-rendered-conductive of said second devices and the said second device which is arranged in back-to-back relation with the first-to-be-rendered-conductive one of said first devices whereby said last-mentioned back-to-back connected valve is rendered conductive, and means timing the operation of said second inverter network whereby said last-mentioned back-to-back connected valve is rendered conductive late in the half cycle of the voltage wave during which it can conduct.

35. A frequency converting apparatus comprising, a plurality of timing networks, each said network including a pair of electric valves and timing means for changing the conductive conditions of one of said valves at the end of a predetermined time after a change in conductivity of the other of said valves, means for changing the conductivity of said other valve of a first of said networks to initiate an overall timing operation, a first controlling circuit connecting said overall timing network to a second of said networks and operable in resopnse to a change in the conductive condition of said other valve of said overall timing network for initiating a timing operation of said second network, said second network being a half cycle timing network, said first circuit being responsive to a change in the conductive condition of said one valve of said overall timing network for terminating the timing operation of said half cycle timing network, said half cycle timing network including a second timing means for changing the conductive condition of its said other valve as a consequence of a change in the conductive condition of its said one valve whereby said valves of said half cycle timing network will be alternated between two current conducting conditions when said predetermined time of said overall timing network is longer than the time of said timing means of said half cycle network, a second controlling circuit connecting said half cycle network to a third of said networks and operable in response to a change in the conductive condition of a first of said valves to change the conductive condition of said other valve of said third network and operable in response to the return of said first valve to its original conductive condition to return said other valve of said third network to its original conductive condition, said third network being a positive interpulse timing network, a third controlling circuit connecting said half cycle timing network to a fourth of said networks and operable in response to a change in the conductive condition of the second of said valves of said half cycle timing network to change the conductive condition of said other valve of said fourth network and operable in response to the return of said second valve to its original conductive condition to return said other valve of said fourth network to its original conductive condition, said fourth network being a negative interpulse timing network, a load current controlling network including a plurality of pairs of back-to-back connected discharge devices, said pairs of said devices being individually connected between each of the phases of such source and such load, a first device of each of said pairs of devices being arranged to conduct current between such source and such load in a first direction, a second device of each of said pairs of devices being arranged to conduct current between such source and such load in a second direction, each said device being provided with means for controlling the instants at which it becomes conductive, an indexing network having a fourth controlling circuit connected to said controlling means of each of said first devices and operable upon actuation from a first to a second operating condition to render each of said second devices conductive in sequence, said indexing network having a fifth controlling circuit connected to said controlling means of each of said second devices and operable upon actuation from a first to a second operating condition to render each of said second devices conductive in sequence, a sixth controlling circuit connecting said positive interpulse timing network to said fourth circuit and operable in response to a change in the conductive condition of said one valve of said positive interpulse network to actuate said fourth circuit of said indexing network whereby said first devices are sequentially rendered conductive, said sixth circuit being operable in response to a return of said one valve of said positive interpulse network to its original conductive condition to terminate further sequences of operation of said first devices, and a seventh controlling circuit connecting said negative interpulse timing network to said fifth circuit of said indexing network and operable in response to a change in the conductive condition of said one valve of said negative interpulse timing network to actuate said fifth circuit of said indexing network whereby said second devices are sequentially rendered conductive, said seventh circuit being operable in response to a return of said one valve of said negative interpulse timing network to its original conductive condition to terminate further sequence of operation of said second devices.

36. The combination of claim 33 in which each said timing means of each of said second, said third, and said fourth networks comprises a chargeable component; each said timing means of said second, said third and said fourth networks having an adjustable component for discharging its respective said chargeable component; a first single control means for adjusting the magnitude of said discharging components whereby equal changes in the discharging time, of each said chargeable component, occur as a result of the adjusting of said first single control means; each said timing means of said second network having a second adjustable component for discharging its respective said chargeable component; a second single control means for adjusting the magnitude of said second discharging components whereby equal changes in the discharging time of each of said chargeable component of said timing means of said second network, occur as a result of the adjusting of said second single control means.

37. The combination of claim 33 in which each said timing means of each of said second, said third, said fourth, and said fifth networks comprises a chargeable component; each said timing means of said second, said third, said fourth, and said fifth networks having a first adjustable component for discharging its respective said chargeable component; a first single control means for adjusting the magnitude of said first discharging components whereby equal changes in the discharging time, of each said chargeable component, occur as a result of the adjusting of said first single control means; each said timing means of said second and said fifth network having a second adjustable component for discharging its respective said chargeable component; a second single control means for adjusting the magnitude of said second discharging components whereby equal changes in the discharging time, of each of said chargeable components of said timing means of said second and said fifth network, occur as a result of the adjusting of said second single control means; each said timing means of said second network having a third adjustable component for discharging its respective said chargeable component; a third single control means for adjusting the magnitude of said third discharging components whereby equal changes in the discharging time, of each of said chargeable components of said timing means of said second network, occur as a result of the adjusting of said third single control means.

38. The combination of claim 33 in which there is provided a single control operator having multiple control elements; said operator being movable into a plurality of positions; one of said control elements being connected to modify the time interval of said timing means of said first timing network; a second of said control elements being connected to modify the connection of said second circuit to said second network, a third of said control elements being connected to modify the connection of said third circuit to said second network; said operator when in a first of its said positions acting to provide a first time interval of said first network timing means, a continuous control of said second circuit by said second network, and a continuous control of said third circuit by said second network; said control operator when in a second of its said positions acting to provide a second time interval of said first network timing means and to render one of said second and said third circuits ineffective to be actuated by said second network.

39. The combination of claim 38 in which there is provided a control mechanism to control the one of said second and said third circuits which is rendered ineffective by said control operator, means connecting said just-named control mechanism for actuation each time said first timing network is actuated so that successive actuations of said first timing network will result in alternate operation of said third and said fourth networks.

40. A frequency converting apparatus comprising, an overall timing network including a timing device for measuring out a predetermined operating period of such apparatus, a frequency timing device operable upon actuation to perform alternately a pair of timing operations, means for initiating an operation of said first network whereby it will act to time out a said operating period, means operatively connecting said networks whereby said second network is actuated during said timing operation of said first network to alternately time out its said pair of operations, a positive interpulse timing network including a timing device for determining the interval between the initiation thereof and the occurrence of its controlling function, a negative interpulse timing network including a timing device for determining the interval between the initiation thereof and the occurrence of its controlling function, means connecting said interpulse timing networks to said frequency timing device whereby the occurrence of one of said pair of timing operations renders said positive interpulse network effective to time out its said timing means and the occurrence of the other of said pair of timing operations renders said negative interpulse network effective to time out its said timing means, a load current controlling network including a plurality of pairs of back-to-back connected discharge devices, said pairs of said devices being individually connected between each of the phases of such source and such load, a first device of each of said pairs of devices being arranged to conduct current between such source and such load in a first direction, a second device of each of said pairs of devices being arranged to conduct current between such source and such load in a second direction, each said device being provided with means for controlling the instants at which it becomes conductive, an indexing network having a first controlling circuit connected to said controlling means of each of said first devices and operable upon actuation from a first to a second operating condition to render each of said second devices conductive in sequence, said indexing network having a second controlling circuit connected to said controlling means of each of said second devices and operable upon actuation from a first to a second operating condition to render each of said second devices conductive in sequence, means interconnecting said positive interpulse network with said first circuit and operable in response to the timing out of said timing means of said positive interpulse network to actuate said first circuit of said indexing network whereby said first devices are sequentially rendered conductive, means interconnecting said negative interpulse network with said timing device of said negative interpulse network to said second circuit of said indexing network and operable in response to the timing out of said timing means of said negative interpulse network to actuate said second circuit of said indexing network whereby said second devices are sequentially rendered conductive, a first inverter network connected to be actuated in timed relation to the actuation of the last-to-be-rendered-conductive of said first devices and operatively connected to render conductive the said first device which is arranged in back-to-back relation with the first-to-be-rendered-conductive one of said second devices, means timing the operation of said inverter network whereby said just-mentioned back-to-back connected valve is rendered conductive late in the half cycle of the voltage wave during which it can conduct, a second inverter network connected to be actuated in timed relation with the actuation of the last-to-be-rendered-conductive of said second devices and operatively connected to render conductive the said second device which is arranged in back-to-back relation with the first-to-be-rendered-conductive one of said first devices, means timing the operation of said second inverter network whereby said last-mentioned back-to-back connected valve is rendered conductive late in the half cycle of the voltage wave during which it can conduct, a power magnitude timing network including a timing device for measuring out a predetermined time interval, means connecting said power timing network for actuation by one of said first two introduced timing networks whereby a timing operation of said timing device of said power network is initiated, a phase shifting apparatus interconnected with said indexing network and operable to determine the time in the voltage waves of such source at which said indexing network renders conductive said back-to-back devices, and means responsive to the timing out of said timing device of said power timing network for controlling the magnitude of the phase shift afforded by said phase shifting apparatus.

41. A frequency converting apparatus comprising, an overall timing network including a timing device for measuring out a predetermined operating period of such apparatus, a frequency timing device operable upon actuation to perform alternately a pair of timing operations, means for initiating an operation of said first network whereby it will act to time out a said operating period, means operatively connecting said networks whereby said second network is actuated during said timing operation of said first network to alternately time out its said pair of operations, a positive interpulse timing network including a timing device for determining the interval between the initiation thereof and the occurrence of its controlling function, a negative interpulse timing network including a timing device for determining the interval between the initiation thereof and the occurrence of its controlling function, means connecting said interpulse timing networks to said frequency timing device whereby the occurrence of one of said pair of timing operations renders said positive interpulse network effective to time out its said timing means and the occurrence of the other of said pair of timing operations renders said negative interpulse network effective to time out its said timing means, a load current controlling network including a plurality of pairs of back-to-back connected discharge devices, said pairs of said devices being individually connected between each of the phases of such source and such load, a first device of each of said pairs of devices being arranged to conduct current between such source and such load in a first direction, a second device of each of said pairs of devices being arranged to conduct current between such source and such load in a second direction, each said device being provided with means for controlling the instants at which it becomes conductive, an indexing network having a first controlling circuit connected to said controlling means of each of said first devices and operable upon actuation from a first to a second operating condition to render each of said second devices conductive in sequence, said indexing network having a second controlling circuit connected to said controlling means of each of said second devices and operable upon actuation from a first to a second operating condition to render each of said second devices conductive in sequence, means interconnecting said positive interpulse network with said first circuit and operable in response to the timing out of said timing means of said positive interpulse network to actuate said first circuit of said indexing network whereby said first devices are sequentially rendered conductive, means interconnecting said negative interpulse network with said timing device of said negative interpulse network to said second circuit of said indexing network and operable in response to the timing out of said timing means of said negative interpulse network to actuate said second circuit of said indexing network whereby said second devices are sequentially rendered conductive, an inverter network connected to be actuated in timed relation to the actuation of the last-to-be-rendered-conductive of said first devices and operatively connected to render conductive the said first device which is arranged in back-to-back relation with the first-to-be-rendered-conductive one of said second devices, means timing the operation of said inverter network whereby said just-mentioned back-to-back connected valve is rendered conductive late in the half cycle of the voltage wave during which it can conduct, a power magnitude timing network including a timing device for measuring out a predetermined time interval, means connecting said power timing network for actuation by one of said first two introduced timing networks whereby a timing operation of said timing device of said power network is initiated, a phase shifting apparatus interconnected with said indexing network and operable to determine the time in the voltage waves of such source at which said indexing network renders conductive said back-to-back devices, and means responsive to the timing out of said timing device of said power timing network for controlling the magnitude of the phase shift afforded by said phase shifting apparatus.

42. A frequency converting apparatus comprising, an overall timing network including a timing device for measuring out a predetermined operating period of such apparatus, a frequency timing device operable upon actuation to perform alternately a pair of timing operations, means for initiating an operation of said first network whereby it will act to time out a said operating period, means operatively connecting said networks whereby said second network is actuated during said timing operation of said first network to alternately time out its said pair of operations, a positive interpulse timing network including a timing device for determining the interval between the initiation thereof and the occurrence of its controlling function, a negative interpulse timing network including a timing device for determining the interval between the initiation thereof and the occurrence of its controlling function, means connecting said interpulse timing networks to said frequency timing device whereby the occurrence of one of said pair of timing operations said positive interpulse network is rendered effective to time out its said timing means and the occurrence of the other of said pair of timing operations said negative interpulse network is rendered effective to time out its said timing means, a load current controlling network including a plurality of pairs of back-to-back connected discharge devices, said pairs of said devices being individually connected between each of the phases of such source and such load, a first device of each of said pairs of devices being arranged to conduct current between such source and such load in a first direction, a second device of each of said pairs of devices being arranged to conduct current between such source and such load in a second direction, each said device being provided with means for controlling the instants at which it becomes conductive, an indexing network having a first controlling circuit connected to said controlling means of each of said first devices and operable upon actuation from a first to a second operating condition to render each of said second devices conductive in sequence, said indexing network having a second controlling circuit connected to said controlling means of each of said second devices and operable upon actuation from a first to a second operating condition to render each of said second devices conductive in sequence, means interconnecting said positive interpulse network with said first circuit and operable in response to the timing out of said timing means of said positive interpulse network to actuate said first circuit of said indexing network whereby said first devices are sequentially rendered conductive, means interconnecting said negative interpulse network with said timing device of said negative interpulse network to said second circuit of said indexing network and operable in response to the timing out of said timing means of said negative interpulse network to actuate said second circuit of said indexing network whereby said second devices are sequentially rendered conductive, a first inverter network connected to be actuated in timed relation to the actuation of the last-to-be-rendered-conductive of said first devices and operatively connected to render conductive the said first device which is arranged in back-to-back relation with the first-to-be-rendered-conductive one of said second devices, means timing the operation of said inverter network whereby said just-mentioned back-to-back connected valve is rendered conductive late in the half cycle of the voltage wave during which it can conduct, a second inverter network connected to be actuated in timed relation with the actuation of the last-to-be-rendered-conductive of said second devices and operatively connected to render conductive the said second device which is arranged in back-to-back relation with the first-to-be-rendered-conductive one of said first devices, and means timing the operation of said second inverter network whereby said last-mentioned back-to-back connected valve is rendered conductive late in the half cycle of the voltage wave during which is can conduct.

43. In an electrical control system for transferring electrical energy from a source of polyphase energy to a load, a first set of asymmetric current conducting devices individually connected between the phases of said source and said load and operable when conducting to conduct current to said load in a first direction, a second set of asymmetric current conducting devices connected between the phases of said source and said load and operable when conducting to conduct current to said load in a second direction, a free running multivibrator including a pair of electric discharge devices alternately rendered conductive and nonconductive in timed frequency, a pair of impedance elements, each said impedance element being connected to be energized as a consequence of a separate one of said discharge devices, a first means for rendering said first set of asymmetric devices conductive, a second means for rendering said second set of asymmetric devices conductive, a control apparatus having at least a pair of controlling positions, said apparatus when in a first of said positions operatively connecting said first means for actuation in response to the energization of a first of said impedance elements and operatively connecting said second means for actuation in response to the energization of the second of said impedance elements, said apparatus when in a second of said positions operatively connecting solely one of said means for actuation in response to solely one of said impedance elements, and means for rendering said multivibrator effective to make solely a single of said alternations, said last named means being effective solely when said control apparatus is in its said second position.

44. Apparatus comprising alternating current supply conductors, alternating current load conductors, controlling means interconnecting said supply conductors and said load conductors for current flow of one polarity to said load conductors, said controlling means having a plurality of settings determinative of the points in the half cycles of voltage of said supply conductors at which current flows from said supply conductors to said load conductors, means for initiating operation of said controlling means at one setting thereof, a relay having an input circuit and an output circuit operated by controlling the energization of said input circuit, means responsive to the operation of said output circuit of said relay for changing the setting of said controlling means, and means responsive after a predetermined number of periods of conduction of said controlling means at said one setting thereof for controlling the energization of said relay input circuit.

45. Apparatus comprising polyphase alternating current supply conductors, polyphase alternating current load conductors, controlling means connecting said supply conductors with said load conductors for current flow of one polarity in a predetermined phase sequence, said controlling means having a plurality of settings determinative of the points in the half cycles of voltage of said supply conductors at which current flows from said supply conductors to said load conductors, means for initiating operation of said controlling means at one setting thereof, a relay having an input circuit and an output circuit operated by controlling the energization of said input circuit, means responsive to the operation of said output circuit of said relay for changing the setting of said controlling means, and means actuated in timed relation to the initiation of a current flow of one phase of said phase sequence in said controlling means at said one setting thereof after it has occurred a predetermined number of times for controlling the energization of said relay input circuit.

46. Apparatus comprising polyphase supply conductors, polyphase load conductors, a group of electric discharge devices each having an anode, a cathode, a control element, and a control element circuit connecting its control element and cathode, means connecting said anodes and cathodes of said electric discharge devices in circuit with said supply conductors for applying voltages of the same polarity to said load conductors, a phase shift cricuit for each of said electric dicharge devices, a plurality of circuit means connected in a different ones of said phase shift circuits for controlling the phase shift settings thereof, a timer, means initiating operation of said timer and conduction of said electric discharge devices in phase sequence beginning with conduction in one of said electric discharge devices, and means effective after the timing out operation of said timer and actuated in timed relation to the conduction in one of said electric discharge devices for initiating the energization of said circuit means.

References Cited in the file of this patent
UNITED STATES PATENTS

| | | |
|---|---|---|
| 1,947,231 | Sabbah | Feb. 13, 1934 |
| 2,366,038 | Livingston | Dec. 26, 1944 |
| 2,385,214 | Livingston | Sept. 18, 1945 |
| 2,431,083 | Sciaky | Nov. 18, 1947 |
| 2,538,515 | Hanchett | Jan. 16, 1951 |
| 2,561,080 | Van De Wiel | July 17, 1951 |